US012135408B2

(12) United States Patent
Lou

(10) Patent No.: US 12,135,408 B2
(45) Date of Patent: Nov. 5, 2024

(54) CAMERA LENS ASSEMBLY

(71) Applicant: ZHEJIANG SUNNY OPTICAL CO., LTD, Ningbo (CN)

(72) Inventor: Qiqi Lou, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 904 days.

(21) Appl. No.: 17/022,600

(22) Filed: Sep. 16, 2020

(65) Prior Publication Data

US 2020/0409123 A1    Dec. 31, 2020

Related U.S. Application Data

(63) Continuation of application No. PCT/CN2019/102141, filed on Aug. 23, 2019.

(30) Foreign Application Priority Data

Nov. 12, 2018   (CN) .......................... 201811339846.2

(51) Int. Cl.
*G02B 13/00*        (2006.01)
*G02B 9/62*         (2006.01)

(52) U.S. Cl.
CPC ........... *G02B 13/0045* (2013.01); *G02B 9/62* (2013.01)

(58) Field of Classification Search
CPC ...... G02B 13/0045; G02B 9/62; G02B 13/06; G02B 13/18; G02B 13/008; G02B 13/14; G02B 13/00

(Continued)

(56) References Cited

U.S. PATENT DOCUMENTS 7,933,078 B2 *   4/2011   Jung ................... G02B 13/006
                                                359/713
9,158,094 B1 *  10/2015   Chen ....................... G02B 9/62
(Continued)

FOREIGN PATENT DOCUMENTS

CN        201438236 U      4/2010
CN        103430074 A     12/2013
(Continued)

OTHER PUBLICATIONS

First Examination Report issued in Indian Patent Application No. 202017039063; mailed Jul. 20, 2021; 5 pgs.
(Continued)

*Primary Examiner* — Jie Lei
*Assistant Examiner* — Kuei-Jen L Edenfield
(74) *Attorney, Agent, or Firm* — HAUPTMAN HAM, LLP

(57) ABSTRACT

The present disclosure discloses a camera lens assembly including a first lens, a second lens, a third lens, a fourth lens, a fifth lens and a sixth lens. The first lens has negative refractive power, and an image-side surface thereof is concave; the second lens has negative refractive power, an object-side surface thereof is convex, and an image-side surface thereof is concave; the third lens has positive refractive power, and an image-side surface thereof is convex; the fourth lens has refractive power; the fifth lens has refractive power; and the sixth lens has positive refractive power. An effective focal length f1 of the first lens and an effective focal length f3 of the third lens satisfy $-1<f1/f3<-0.5$; and an effective focal length f2 of the second lens and the effective focal length f3 of the third lens satisfy $-8<f2/f3<-3$.

20 Claims, 7 Drawing Sheets

(58) Field of Classification Search
USPC ....... 359/752, 756, 770, 781, 762, 658, 739, 359/713, 350, 353, 356, 708
See application file for complete search history.

(56) References Cited

U.S. PATENT DOCUMENTS

| | | | |
|---|---|---|---|
| 2013/0050846 A1* | 2/2013 | Huang | G02B 1/041 |
| | | | 359/713 |
| 2015/0062720 A1* | 3/2015 | Lai | G02B 3/02 |
| | | | 359/713 |
| 2017/0102526 A1 | 4/2017 | Chen | |
| 2017/0184818 A1* | 6/2017 | Dai | G02B 13/0045 |
| 2018/0106987 A1* | 4/2018 | Lin | G02B 27/0025 |
| 2018/0299649 A1* | 10/2018 | Hsu | G02B 9/62 |

FOREIGN PATENT DOCUMENTS

| | | |
|---|---|---|
| CN | 104330868 A | 2/2015 |
| CN | 104991331 A | 10/2015 |
| CN | 106501922 A | 3/2017 |
| CN | 106950681 A | 7/2017 |
| CN | 107436476 A | 12/2017 |
| CN | 108732716 A | 11/2018 |
| CN | 108983401 A | 12/2018 |
| CN | 109116522 A | 1/2019 |
| CN | 208833990 U | 5/2019 |
| CN | 209148945 U | 7/2019 |
| JP | 2007139985 A | 6/2007 |
| JP | 2007279632 A | 10/2007 |
| JP | 2008112000 A | 5/2008 |
| JP | 2009092798 A | 4/2009 |
| JP | 2012037768 A | 2/2012 |
| JP | 2013073141 A | 4/2013 |
| JP | 2013073165 A | 4/2013 |
| JP | 2015190999 A | 11/2015 |
| JP | 2018116076 A | 7/2018 |
| KR | 1020090106242 A | 10/2009 |
| TW | I594010 B | 8/2017 |

OTHER PUBLICATIONS

International Search Report issued in corresponding International Application No. PCT/CN2019/102141, mailed Nov. 25, 2019, pp. 1-2, China National Intellectual Property Administration, Beijing, China.

* cited by examiner

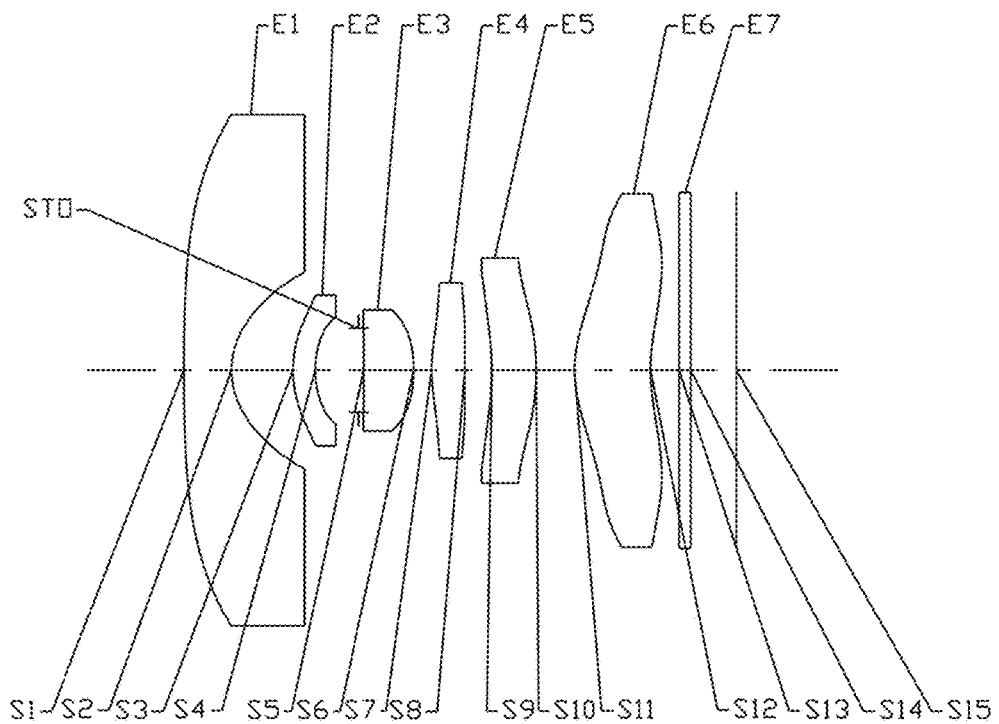
Fig. 1
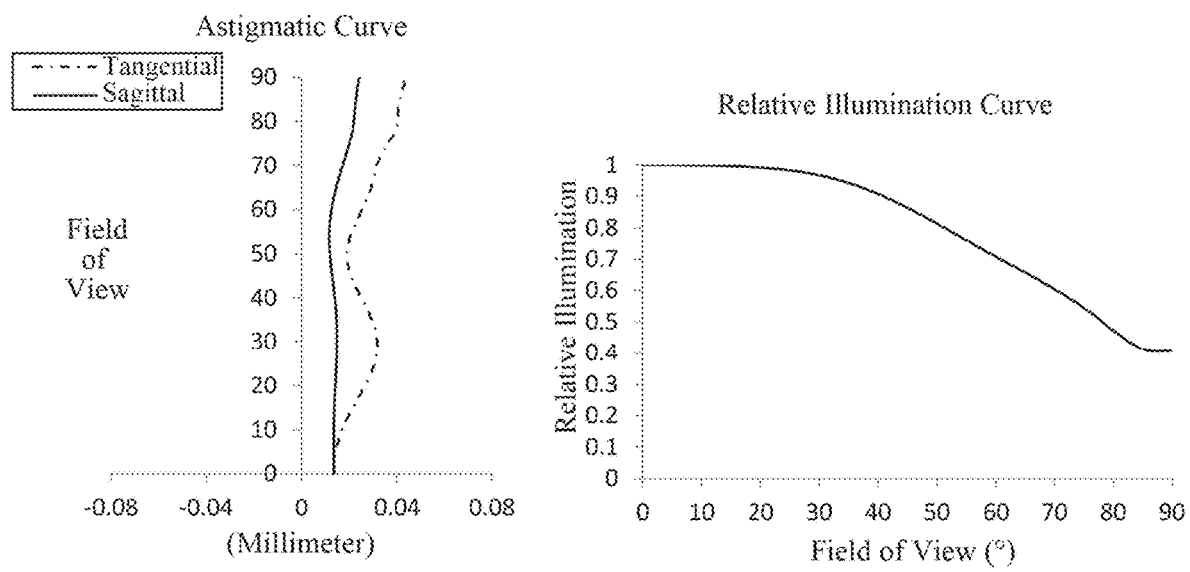
Fig. 2A
Fig. 2B

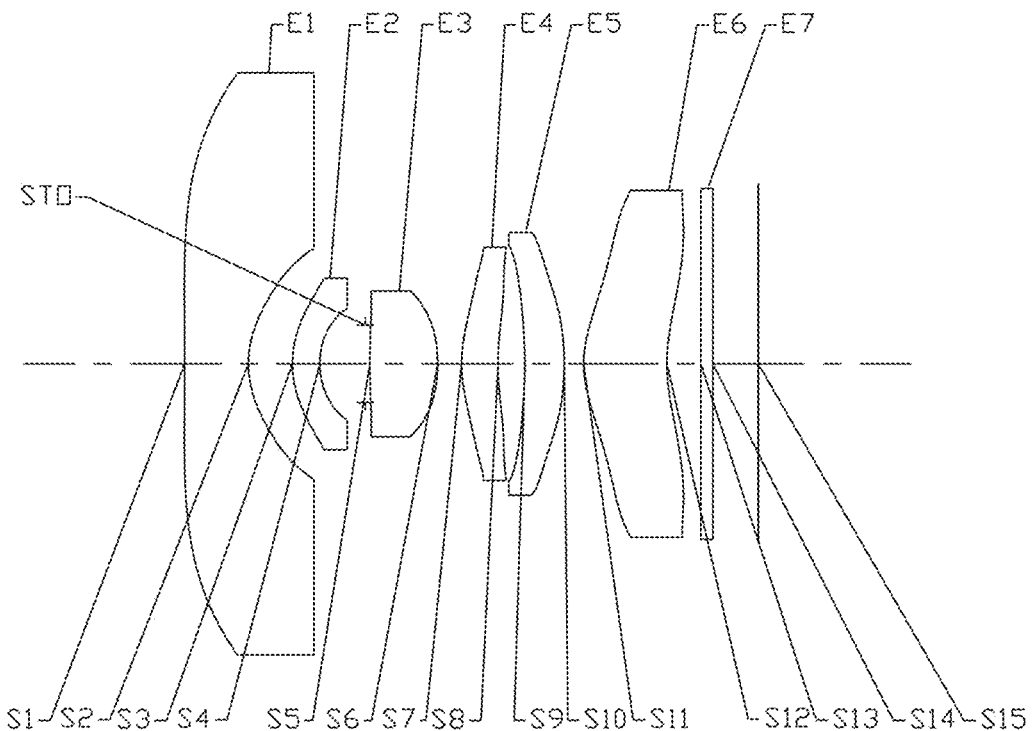
Fig. 5
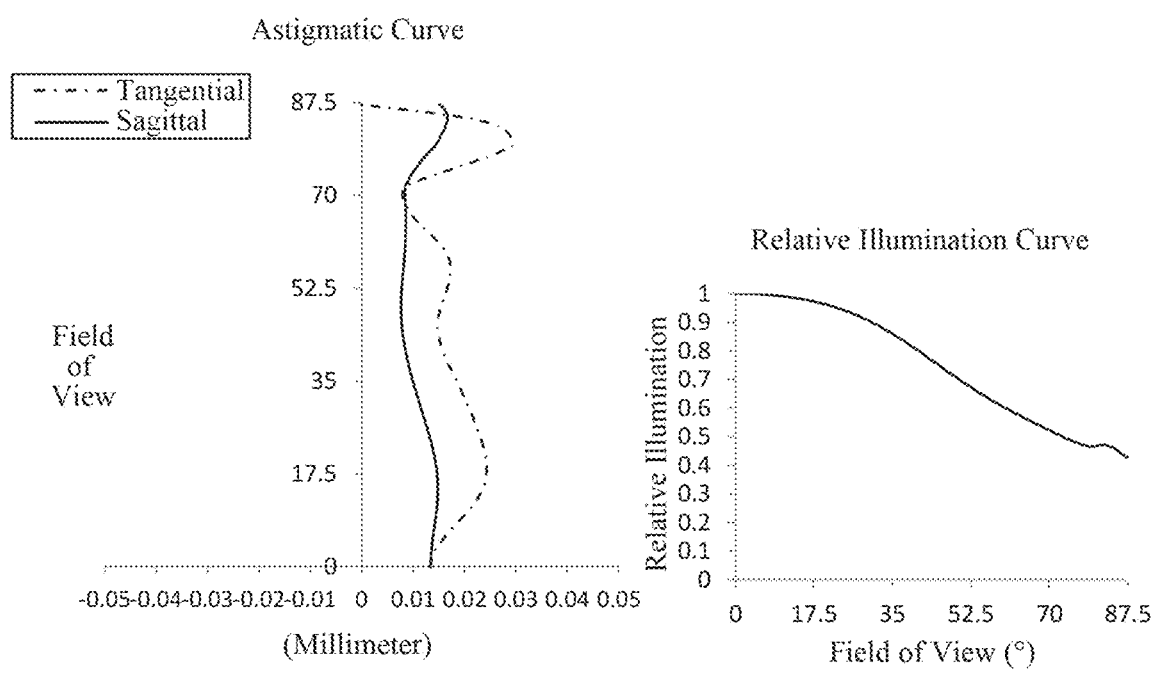
Fig. 6A                    Fig. 6B

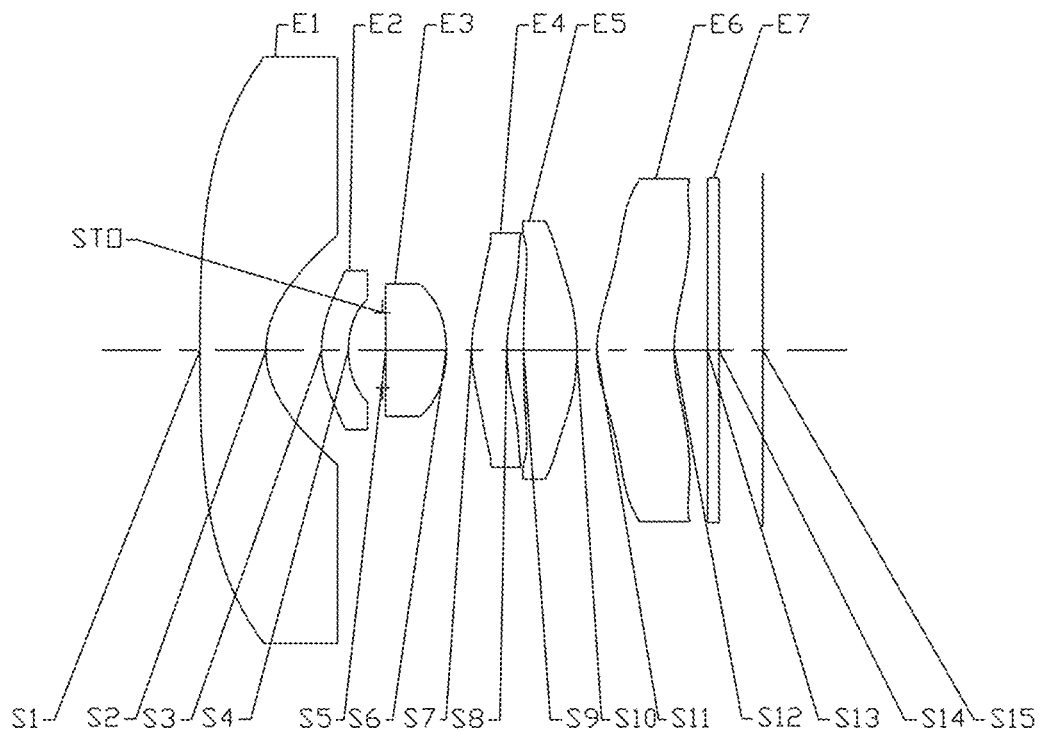
Fig. 11
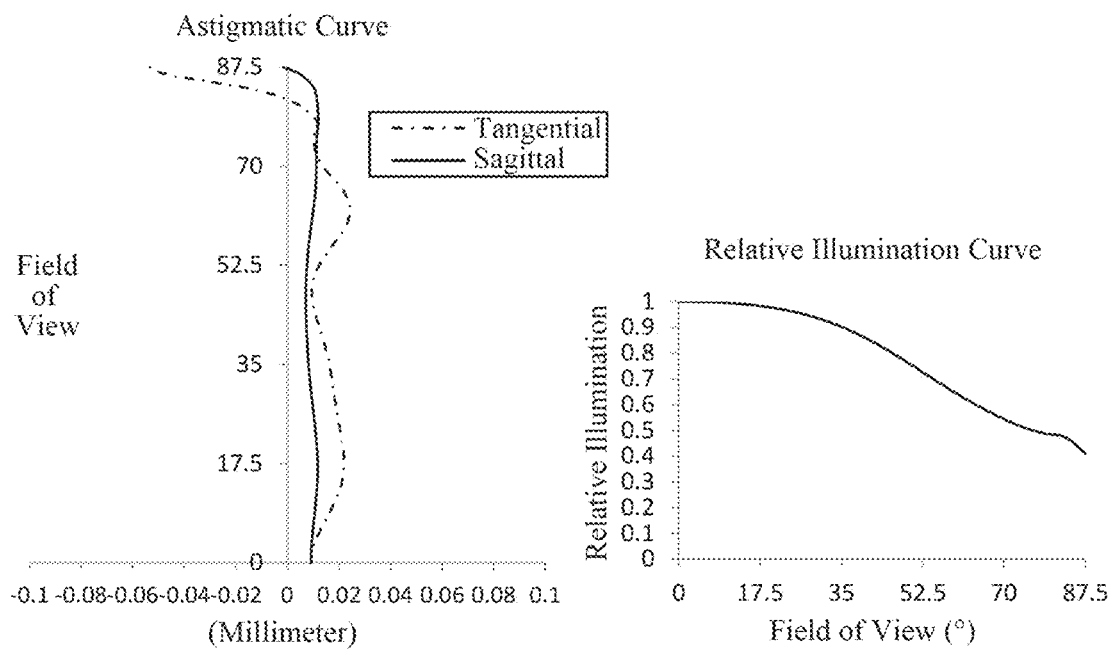
Fig. 12A
Fig. 12B

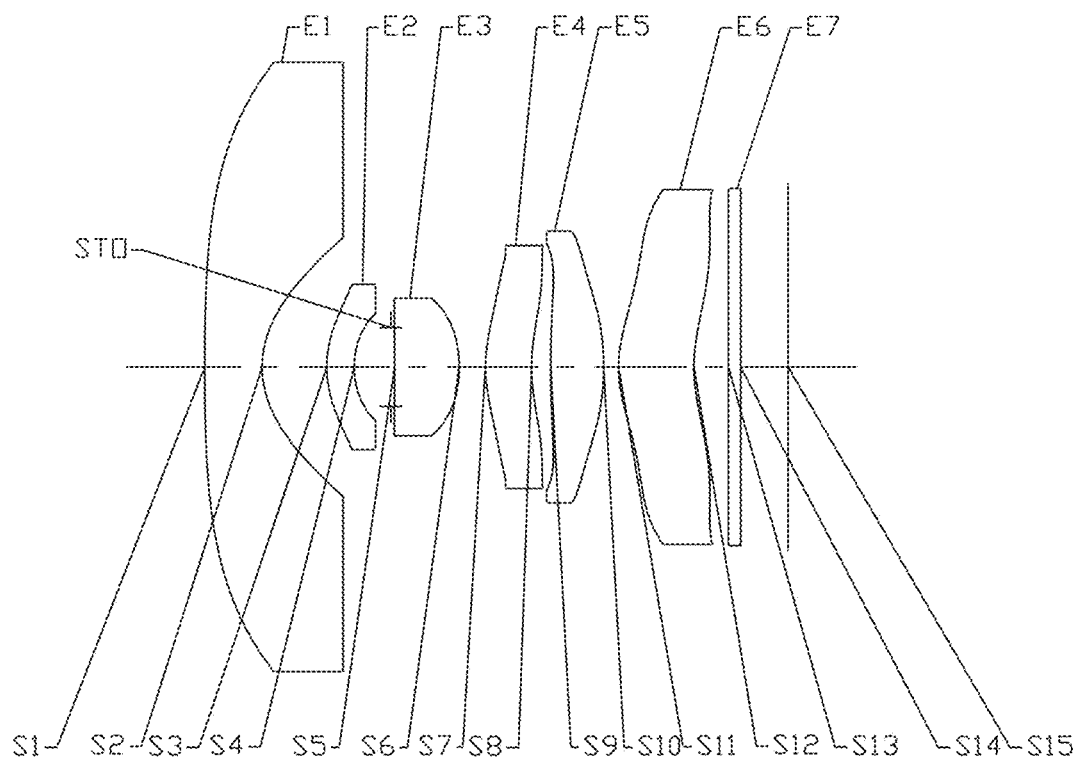
Fig. 13
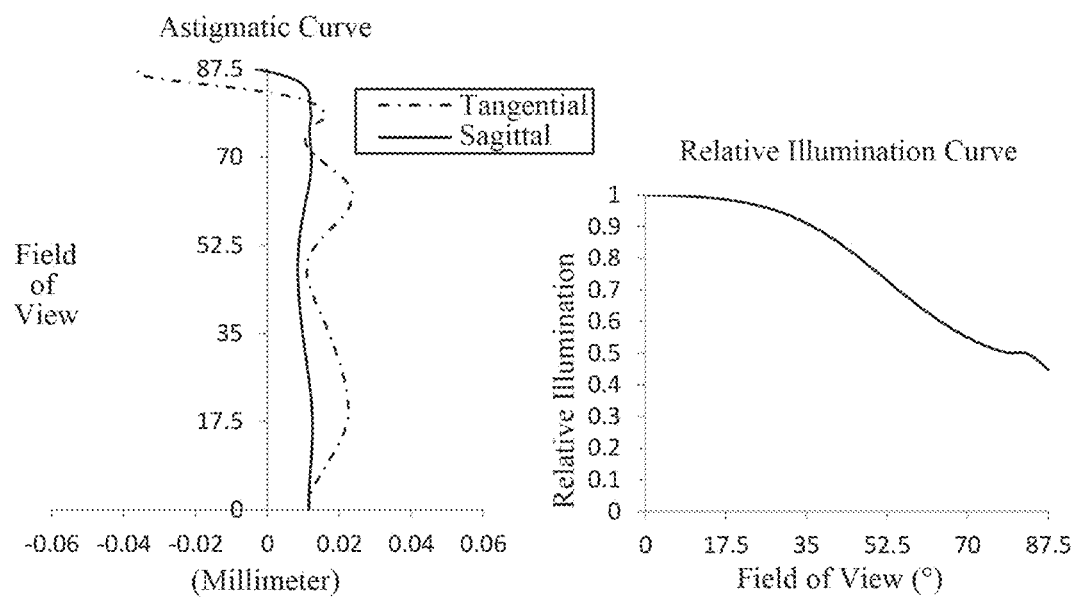
Fig. 14A
Fig. 14B

CAMERA LENS ASSEMBLY

CROSS-REFERENCE TO RELATED APPLICATIONS

The present patent application is a continuation of International Application No. PCT/CN2019/102141, filed on Aug. 23, 2019, which claims priority to Chinese Patent Application No. 201811339846.2, filed before the China National Intellectual Property Administration (CNIPA) on Nov. 12, 2018. Both of the aforementioned patent applications are hereby incorporated by reference in their entireties.

TECHNICAL FIELD

The present disclosure relates to a camera lens assembly, and more specifically, relates to a camera lens assembly including six lenses.

BACKGROUND

As the market demand changes, ultra-wide-angle lens assemblies are increasingly used in fields such as vehicles, surveillance, and virtual reality. However, the ultra-wide-angle lens assembly usually has a relatively large size, which prevents the lens assembly from being used in various miniaturized portable electronic devices. In addition, most of the current ultra-wide-angle lens assemblies still have the problems of low pixels and low relative illumination, which makes the shooting images not uniform enough to provide better images.

SUMMARY

The present disclosure provides an ultra-wide-angle camera lens assembly that is applicable to portable electronic products and at least solves or partially solves at least one of the above disadvantages of the prior art.

In one aspect, the present disclosure provides a camera lens assembly which includes, sequentially from an object side to an image side along an optical axis, a first lens, a second lens, a third lens, a fourth lens, a fifth lens and a sixth lens. The first lens may have negative refractive power, and an image-side surface thereof may be a concave surface; the second lens may have negative refractive power, an object-side surface thereof may be a convex surface, and an image-side surface thereof may be a concave surface; the third lens may have positive refractive power, and an image-side surface thereof may be a convex surface; the fourth lens has refractive power; the fifth lens has refractive power; and the sixth lens has refractive power.

In one embodiment, the sixth lens may have positive refractive power.

In one embodiment, an effective focal length f1 of the first lens and an effective focal length f3 of the third lens may satisfy $-1 < f1/f3 < -0.5$; and an effective focal length f2 of the second lens and the effective focal length f3 of the third lens may satisfy $-8 < f2/f3 < -3$.

In one embodiment, a radius of curvature R2 of the image-side surface of the first lens and a total effective focal length f of the camera lens assembly may satisfy $0.5 < R2/f < 1$.

In one embodiment, a center thickness CT2 of the second lens along the optical axis, a center thickness CT3 of the third lens along the optical axis, a center thickness CT4 of the fourth lens along the optical axis, a center thickness CT5 of the fifth lens along the optical axis and a distance TD along the optical axis from an object-side surface of the first lens to an image-side surface of the sixth lens may satisfy $(CT2+CT3+CT4+CT5)/TD < 0.5$.

In one embodiment, a center thickness CT4 of the fourth lens along the optical axis and a center thickness CT6 of the sixth lens along the optical axis may satisfy $0.3 < CT4/CT6 < 0.85$.

In one embodiment, a refractive index N5 of the fifth lens may satisfy $N5 < 1.6$.

In one embodiment, an effective half-aperture DT11 of an object-side surface of the first lens and half of a diagonal length ImgH of an effective pixel area of an electronic photosensitive element on an imaging plane of the camera lens assembly may satisfy $1.2 < DT11/ImgH < 1.8$.

In one embodiment, an effective half-aperture DT62 of an image-side surface of the sixth lens and half of a diagonal length ImgH of an effective pixel area of an electronic photosensitive element on an imaging plane of the camera lens assembly may satisfy $0.8 < DT62/ImgH < 1.1$.

In one embodiment, an effective half-aperture DT12 of the image-side surface of the first lens and an effective half-aperture DT21 of the object-side surface of the second lens may satisfy $1.2 < DT12/DT21 < 1.7$.

In one embodiment, a center thickness CT2 of the second lens along the optical axis and an edge thickness ET2 of the second lens may satisfy $1 < CT2/ET2 < 1.3$.

In one embodiment, SAG11, being an on-axis distance from an intersection of an object-side surface of the first lens and the optical axis to a vertex of a maximum effective half-aperture of the object-side surface of the first lens, and SAG12, being an on-axis distance from an intersection of the image-side surface of the first lens and the optical axis to a vertex of a maximum effective half-aperture of the image-side surface of the first lens, may satisfy $0.5 < SAG11/SAG12 < 1$.

In one embodiment, an on-axis distance SAG12 from an intersection of the image-side surface of the first lens and the optical axis to a vertex of a maximum effective half-aperture of the image-side surface of the first lens and a center thickness CT1 of the first lens along the optical axis may satisfy $1 < SAG12/CT1 < 1.7$.

In one embodiment, half of a diagonal length ImgH of an effective pixel area of an electronic photosensitive element on an imaging plane of the camera lens assembly and a total effective focal length f of the camera lens assembly may satisfy $ImgH^2/f > 4.5$ mm.

In one embodiment, the camera lens assembly may further include a stop, a distance SL along the optical axis from the stop to an imaging plane of the camera lens assembly and a distance TTL along the optical axis from an object-side surface of the first lens to the imaging plane of the camera lens assembly may satisfy $0.6 < SL/TTL < 1$. Optionally, the stop is disposed between the second lens and the third lens.

In one embodiment, a maximum incident angle CRAmax of a chief ray incident onto an electronic photosensitive element on an imaging plane of the camera lens assembly may satisfy $10° < CRAmax < 20°$.

In one embodiment, a working wavelength band of the camera lens assembly may be in a range from about 800 nm to about 1000 nm.

In another aspect, the present disclosure also provides a camera lens assembly which includes, sequentially from an object side to an image side along an optical axis, a first lens, a second lens, a third lens, a fourth lens, a fifth lens and a sixth lens. The first lens may have negative refractive power, and an image-side surface thereof may be a concave surface; the second lens may have negative refractive power, an object-side surface thereof may be a convex surface, and an image-side surface thereof may be a concave surface; the third lens may have positive refractive power, and an image-side surface thereof may be a convex surface; the fourth lens has refractive power; the fifth lens has refractive power; and the sixth lens has refractive power. An effective half-aperture DT11 of an object-side surface of the first lens and half of a diagonal length ImgH of an effective pixel area of an electronic photosensitive element on an imaging plane of the camera lens assembly may satisfy 1.2<DT11/ImgH<1.8.

The present disclosure employs six lenses, and the above camera lens assembly has at least one beneficial effect, such as small size, high brightness, high image quality, and ultra-wide angle and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of a camera lens assembly according to Example 1 of the present disclosure;

FIGS. 2A and 2B illustrate an astigmatic curve and a relative illumination curve of the camera lens assembly of the Example 1, respectively;

FIG. 5 illustrates a schematic structural view of a camera lens assembly according to Example 3 of the present disclosure;

FIGS. 6A and 6B illustrate an astigmatic curve and a relative illumination curve of the camera lens assembly of the Example 3, respectively;

FIG. 11 illustrates a schematic structural view of a camera lens assembly according to Example 6 of the present disclosure;

FIGS. 12A and 12B illustrate an astigmatic curve and a relative illumination curve of the camera lens assembly of the Example 6, respectively;

FIG. 13 illustrates a schematic structural view of a camera lens assembly according to Example 7 of the present disclosure; and FIGS. 14A and 14B illustrate an astigmatic curve and a relative illumination curve of the camera lens assembly of the Example 7, respectively.

DETAILED DESCRIPTION OF EMBODIMENTS

Figure 3:
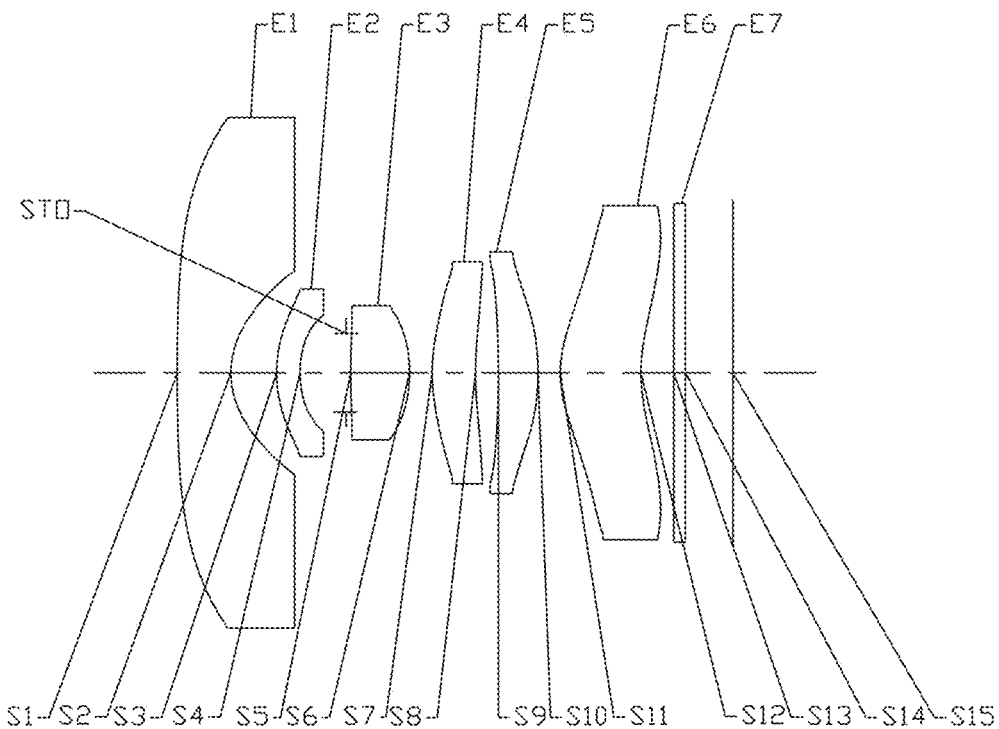
FIG. 3 illustrates a schematic structural view of a camera lens assembly according to Example 2 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples. The features, principles, and other aspects of the present disclosure are described in detail below.

A camera lens assembly according to an exemplary embodiment of the present disclosure may include, for example, six lenses (i.e. a first lens, a second lens, a third lens, a fourth lens, a fifth lens and a sixth lens) having refractive power. The six lenses are arranged sequentially from an object side to an image side along an optical axis. There may be an air interval between each two adjacent lenses.

In an exemplary embodiment, the first lens may have negative refractive power, and an image-side surface thereof may be a concave surface; the second lens may have negative refractive power, an object-side surface thereof may be a convex surface, and an image-side surface thereof may be a concave surface; the third lens may have positive refractive power, and an image-side surface thereof may be a convex surface; the fourth lens has positive or negative refractive power; the fifth lens has positive or negative refractive power; and the sixth lens has positive or negative refractive power.

In an exemplary embodiment, the camera lens assembly according to the present disclosure may satisfy: $-1<f1/f3<-0.5$, where f1 is an effective focal length of the first lens, and f3 is an effective focal length of the third lens. More specifically, f1 and f3 may further satisfy: $-0.8<f1/f3<-0.5$, for example, $-0.75 \leq f1/f3 \leq -0.57$.

In an exemplary embodiment, the camera lens assembly according to the present disclosure may satisfy: $-8<f2/f3<-3$, where f2 is an effective focal length of the second lens, and f3 is an effective focal length of the third lens. More specifically, f2 and f3 may further satisfy: $-8<f2/f3<-3.3$, for example, $-7.96 \leq f2/f3 \leq -3.45$.

By reasonably distributing the focal lengths of the first lens, the second lens and the third lens, it is beneficial for the first to the third lenses to better share the ultra-wide-angle field-of-view. At the same time, it is beneficial to reduce the astigmatic and coma of the system, thereby effectively improving the image quality.

In an exemplary embodiment, the first lens may have negative refractive power, and an image-side surface thereof may be a concave surface; the second lens may have negative refractive power, an object-side surface thereof may be a convex surface, and an image-side surface thereof may be a concave surface; the third lens may have positive refractive power, and an image-side surface thereof may be a convex surface; the fourth lens has positive or negative refractive power; the fifth lens has positive or negative refractive power, and an image-side surface thereof may be a convex surface; and the sixth lens has positive or negative refractive power.

In an exemplary embodiment, the camera lens assembly according to the present disclosure may satisfy: $ImgH^2/f>4.5$ mm, where ImgH is half of a diagonal length of an effective pixel area of an electronic photosensitive element on an imaging plane of the camera lens assembly, and f is a total effective focal length of the camera lens assembly. More specifically, ImgH and f may further satisfy: $ImgH^2/f>5$ mm, for example, $5.23$ mm$\leq ImgH^2/f \leq 5.59$ mm. By satisfying the conditional expression $ImgH^2/f>4.5$ mm, it is beneficial to ensure the large image plane and short focal length of the lens assembly. At the same time, it is beneficial to achieve clear imaging quality.

In an exemplary embodiment, the fourth lens may have positive refractive power, and an object-side surface thereof may be a convex surface.

In an exemplary embodiment, the sixth lens may have positive refractive power, an object-side surface thereof may be a convex surface, and an image-side surface thereof may be a concave surface.

In an exemplary embodiment, the camera lens assembly according to the present disclosure may satisfy: $0.5<R2/f<1$, where R2 is a radius of curvature of the image-side surface of the first lens, and f is a total effective focal length of the camera lens assembly. More specifically, R2 and f may further satisfy: $0.76 \leq R2/f \leq 0.94$. When the conditional expression $0.5<R2/f<1$ is satisfied, the ultra-wide-angle field-of-view may be better shared, and the field curvature and astigmatic of the system may be effectively reduced.

In an exemplary embodiment, the camera lens assembly according to the present disclosure may satisfy: $(CT2+CT3+CT4+CT5)/TD<0.5$, where CT2 is a center thickness of the second lens along the optical axis, CT3 is a center thickness of the third lens along the optical axis, CT4 is a center thickness of the fourth lens along the optical axis, CT5 is a center thickness of the fifth lens along the optical axis, and TD is a distance along the optical axis from an object-side surface of the first lens to an image-side surface of the sixth lens. More specifically, CT2, CT3, CT4, CT5 and TD may further satisfy: $0.2<(CT2+CT3+CT4+CT5)/TD<0.4$, for example, $0.32 \leq (CT2+CT3+CT4+CT5)/TD \leq 0.39$. Satisfying the conditional expression $(CT2+CT3+CT4+CT5)/TD<0.5$ may effectively shorten the total length of the system and reduce the field curvature of the system.

In an exemplary embodiment, the camera lens assembly according to the present disclosure may satisfy: $0.3<CT4/CT6<0.85$, where CT4 is a center thickness of the fourth lens along the optical axis, and CT6 is a center thickness of the sixth lens along the optical axis. More specifically, CT4 and CT6 may further satisfy: $0.43 \leq CT4/CT6 \leq 0.80$. When the conditional expression $0.3<CT4/CT6<0.85$ is satisfied, the correction of the field curvature may be well achieved, thereby achieving high-pixel image quality.

In an exemplary embodiment, the camera lens assembly according to the present disclosure may satisfy: $N5<1.6$, where N5 is a refractive index of the fifth lens. More specifically, N5 may further satisfy: $1.5<N5<1.6$, for example, $N5=1.53$. Properly setting the refractive index of the fifth lens is beneficial to reducing the refractive power of the fourth lens and the fifth lens, thereby reducing the decentering sensitivity of the system.

The camera lens assembly according to the present disclosure may also be disposed a stop to improve the image quality of the lens assembly. In an exemplary embodiment, the camera lens assembly according to the present disclosure may satisfy: $0.6<SL/TTL<1$, where SL is a distance along the optical axis from the stop to an imaging plane of the camera lens assembly, and TTL is a distance along the optical axis from an object-side surface of the first lens to the imaging plane of the camera lens assembly. More specifically, SL and TTL may further satisfy: $0.68 \leq SL/TTL \leq 0.70$. By reasonably setting the stop position, it is beneficial to shorten the total length of the system and reduce the aperture of the front end of the system. Optionally, the stop may be disposed between the second lens and the third lens.

In an exemplary embodiment, the camera lens assembly according to the present disclosure may satisfy: $1.2<DT11/ImgH<1.8$, where DT11 is an effective half-aperture of an object-side surface of the first lens, and ImgH is half of a diagonal length of an effective pixel area of an electronic photosensitive element on an imaging plane of the camera lens assembly. More specifically, DT11 and ImgH may further satisfy: $1.43 \leq DT11/ImgH \leq 1.68$. By reasonably constraining the aperture of the first lens and the size of the image plane, it is beneficial to reduce the size of the system.

In an exemplary embodiment, the camera lens assembly according to the present disclosure may satisfy: 0.8<DT62/ImgH<1.1, where DT62 is an effective half-aperture of an image-side surface of the sixth lens, and ImgH is half of a diagonal length of an effective pixel area of an electronic photosensitive element on an imaging plane of the camera lens assembly. More specifically, DT62 and ImgH may further satisfy: 0.96≤DT62/ImgH≤0.99. By reasonably constraining the aperture of the sixth lens and the size of the image plane, it is beneficial to configure the chief ray angle of the system to be matched with the chief ray angle of the chip, thereby achieving the uniformity of the image plane.

In an exemplary embodiment, the camera lens assembly according to the present disclosure may satisfy: 1.2<DT12/DT21<1.7, where DT12 is an effective half-aperture of the image-side surface of the first lens, and DT21 is an effective half-aperture of the object-side surface of the second lens. More specifically, DT12 and DT21 may further satisfy: 1.21≤DT12/DT21≤1.64. Reasonably constraining the apertures of the first lens and the second lens will help the distribution of the field-of-view and the correction of astigmatic.

In an exemplary embodiment, the camera lens assembly according to the present disclosure may satisfy: 1<CT2/ET2<1.3, where CT2 is a center thickness of the second lens along the optical axis, and ET2 is an edge thickness of the second lens. More specifically, CT2 and ET2 may further satisfy: 1.01≤CT2/ET2≤1.20. Satisfying the conditional expression 1<CT2/ET2<1.3 is beneficial to correcting the curvature of field and the coma, thereby achieving clear image quality.

In an exemplary embodiment, the camera lens assembly according to the present disclosure may satisfy: 0.5<SAG11/SAG12<1, where SAG11 is an on-axis distance from an intersection of an object-side surface of the first lens and the optical axis to a vertex of a maximum effective half-aperture of the object-side surface of the first lens, and SAG12 is an on-axis distance from an intersection of the image-side surface of the first lens and the optical axis to a vertex of a maximum effective half-aperture of the image-side surface of the first lens. More specifically, SAG11 and SAG12 may further satisfy: 0.65≤SAG11/SAG12≤0.90. By reasonably configuring the vector heights of the object-side surface and the image-side surface of the first lens, it is beneficial for the first lens to better share the ultra-wide-angle field-of-view while meeting the processing conditions.

In an exemplary embodiment, the camera lens assembly according to the present disclosure may satisfy: 1<SAG12/CT1<1.7, where SAG12 is an on-axis distance from an intersection of the image-side surface of the first lens and the optical axis to a vertex of a maximum effective half-aperture of the image-side surface of the first lens, and CT1 is a center thickness of the first lens along the optical axis. More specifically, SAG12 and CT1 may further satisfy: 1.03≤SAG12/CT1≤1.64. When the conditional expression 1<SAG12/CT1<1.7 is satisfied, the distribution of the field-of-view and the correction of the field curvature may be achieved while meeting the processing conditions.

In an exemplary embodiment, the camera lens assembly according to the present disclosure may satisfy: 10°<CRAmax<20°, where CRAmax is a maximum incident angle of a chief ray incident onto an electronic photosensitive element. More specifically, CRAmax may further satisfy: 10°<CRAmax<15°, for example, 12.93°≤CRAmax≤14.80°. Satisfying the conditional expression 10°<CRAmax<20° is beneficial to improving the image quality, thereby achieving high pixel image quality.

In an exemplary embodiment, a working wavelength band of the camera lens assembly of the present disclosure is in the range from about 800 nm to about 1000 nm. The camera lens assembly according to the present disclosure is used in the infrared wavelength band, and may be used for eye tracking, motion capture, surveillance cameras, etc.

In addition, according to the present disclosure, a total optical length TTL (that is, a distance along the optical axis from an object-side surface of the first lens to an imaging plane of the camera lens assembly) of the camera lens assembly may satisfy 9.5 mm≤TTL≤10.5 mm. At the same time, half of a maximal field-of-view Semi-FOV of the camera lens assembly may satisfy 85°≤Semi-FOV≤95°. Therefore, the camera lens assembly according to the present disclosure may simultaneously achieve a smaller total optical length and a larger field-of-view, and may achieve the characteristics of small size and ultra-wide angle simultaneously.

Optionally, the above camera lens assembly may further include an optical filter for correcting the color deviation and/or a protective glass for protecting the photosensitive element located on an imaging plane.

The camera lens assembly according to the above embodiments of the present disclosure may employ a plurality of lenses, such as six lenses as described above. By properly configuring the refractive power of each lens, the surface shape, the center thickness of each lens, and spaced intervals along the optical axis between the lenses, the size and the sensitivity of the lens assembly may be effectively reduced, and the workability of the lens assembly may be improved, such that the camera lens assembly is more advantageous for production processing and may be applied to portable electronic products. The camera lens assembly configured as described above may also have advantageous effects such as ultra-wide-angle, high brightness, high image quality, etc., may be applied to the near-infrared band, and may be applied to fields such as vehicles, surveillance, and virtual reality.

In the embodiments of the present disclosure, at least one of the surfaces of lenses is aspheric, that is, at least one of the object-side surface and the image-side surface of each of the first lens, the second lens, the third lens, the fourth lens, the fifth lens, and the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the camera lens assembly may be varied to achieve the various results and advantages described in this specification without departing from the technical solution claimed by the present disclosure. For example, although the embodiment is described by taking six lenses as an example, the camera lens assembly is not limited to include six lenses. The camera lens assembly may also include other numbers of lenses if desired.

Some specific examples of a camera lens assembly applicable to the above embodiment will be further described below with reference to the accompanying drawings.

Example 1

A camera lens assembly according to example 1 of the present disclosure is described below with reference to FIG. 1 to FIG. 2B. FIG. 1 shows a schematic structural view of the camera lens assembly according to example 1 of the present disclosure.

As shown in FIG. 1, the camera lens assembly according to an exemplary embodiment of the present disclosure includes a first lens E1, a second lens E2, a stop STO, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

The working wavelength band of the camera lens assembly in this example is in the range of about 800 nm to about 1000 nm.

Table 1 shows surface type, radius of curvature, thickness, material and conic coefficient of each lens of the camera lens assembly in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspheric | 51.2590 | 0.8589 | 1.53 | 55.8 | 89.1101 |
| S2 | Aspheric | 1.4511 | 1.1112 | | | −0.7738 |
| S3 | Aspheric | 2.1604 | 0.4003 | 1.62 | 23.5 | −1.2264 |
| S4 | Aspheric | 1.8448 | 0.7942 | | | −0.5172 |
| STO | Spherical | Infinite | 0.0920 | | | |
| S5 | Aspheric | 44.4663 | 0.9022 | 1.53 | 55.8 | −99.9900 |
| S6 | Aspheric | −2.7641 | 0.3235 | | | 3.3058 |
| S7 | Aspheric | 2.9131 | 0.5988 | 1.53 | 55.8 | −19.4115 |
| S8 | Aspheric | −109.5664 | 0.4885 | | | 99.9900 |
| S9 | Aspheric | −4.3513 | 0.8005 | 1.53 | 55.8 | −34.5026 |
| S10 | Aspheric | −4.7626 | 0.6922 | | | 2.4506 |
| S11 | Aspheric | 2.2133 | 1.3835 | 1.53 | 55.8 | −4.7017 |
| S12 | Aspheric | 3.3670 | 0.5166 | | | −0.0038 |
| S13 | Spherical | Infinite | 0.2100 | 1.52 | 64.2 | |
| S14 | Spherical | Infinite | 0.8239 | | | |
| S15 | Spherical | Infinite | | | | |

As can be seen from Table 1, the object-side surface and the image-side surface of any one of the first lens E1 to the sixth lens E6 are aspheric. In this example, the surface shape x of each aspheric lens may be defined by using, but not limited to, the following aspheric formula:

$$x = \frac{ch^2}{1+\sqrt{1-(k+1)c^2h^2}} + \Sigma A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14 and A16 applicable to each aspheric surface S1 to S12 in example 1.

TABLE 2

| Surface number | A4 | A6 | A8 | A10 | A12 | A14 | A16 |
|---|---|---|---|---|---|---|---|
| S1 | 1.5504E-03 | -1.4594E-05 | 0.0000E+00 | 0.0000E+00 | 0.0000E+00 | 0.0000E+00 | 0.0000E+00 |
| S2 | 1.1446E-02 | 1.0266E-03 | -6.0327E-03 | 4.8206E-03 | -2.2428E-03 | 6.3193E-04 | -7.3384E-05 |
| S3 | 3.1137E-02 | -2.6838E-02 | 3.8729E-03 | 0.0000E+00 | 0.0000E+00 | 0.0000E+00 | 0.0000E+00 |
| S4 | 8.9924E-02 | -1.2020E-01 | 4.5270E-01 | -1.0312E+00 | 1.4372E+00 | -1.0664E+00 | 3.3677E-01 |
| S5 | 7.6535E-03 | -3.6104E-01 | 1.8206E+00 | -5.2697E+00 | 8.6252E+00 | -7.4858E+00 | 2.6706E+00 |
| S6 | -1.1681E-01 | 6.2606E-02 | -2.4730E-02 | 1.7049E-02 | -2.8212E-02 | 2.2478E-02 | -6.5513E-03 |
| S7 | -1.3699E-02 | -6.8685E-02 | 7.2577E-02 | -3.7851E-02 | 1.1934E-02 | -2.2312E-03 | 2.0270E-04 |
| S8 | 4.1897E-02 | -8.1579E-02 | 4.4810E-02 | -5.4009E-03 | -3.5890E-03 | 1.3357E-03 | -1.2342E-04 |
| S9 | 1.5493E-02 | -1.0635E-02 | -7.5882E-03 | 1.3307E-02 | -6.4257E-03 | 1.3147E-03 | -9.7762E-05 |
| S10 | -1.3912E-02 | 2.0543E-02 | -1.3465E-02 | 6.9247E-03 | -2.0480E-03 | 3.0781E-04 | -1.8206E-05 |
| S11 | -1.7878E-02 | 5.0975E-03 | -1.1656E-03 | 1.2205E-04 | 2.5224E-07 | -8.0101E-07 | 3.5763E-08 |
| S12 | -5.2101E-02 | 1.2466E-02 | -2.5719E-03 | 3.0316E-04 | -1.9419E-05 | 6.9331E-07 | -1.5345E-08 |

Table 3 shows a total effective focal length f of the camera lens assembly, effective focal lengths f1 to f6 of respective lens, a distance TTL along the optical axis from the object-side surface S1 of the first lens E1 to the imaging plane S15, half of a diagonal length ImgH of an effective pixel area of an electronic photosensitive element on the imaging plane S15, and half of a maximal field-of-view Semi-FOV of the camera lens assembly in example 1.

TABLE 3

| f (mm) | 1.90 | f5 (mm) | -291.18 |
|---|---|---|---|
| f1 (mm) | -2.85 | f6 (mm) | 8.67 |
| f2 (mm) | -39.59 | TTL (mm) | 10.00 |
| f3 (mm) | 4.97 | ImgH (mm) | 3.26 |
| f4 (mm) | 5.40 | Semi-FOV (°) | 90.6 |

FIG. 2A illustrates an astigmatic curve of the camera lens assembly according to example 1, representing a curvature of a tangential plane and a curvature of a sagittal plane. FIG. 2B illustrates a relative illumination curve of the camera lens assembly according to example 1, representing the relative illumination corresponding to different viewing angles. It can be seen from FIG. 2A and FIG. 2B that the camera lens assembly provided in example 1 may achieve good image quality.

Example 2

A camera lens assembly according to example 2 of the present disclosure is described below with reference to FIG. 3 to FIG. 4B. In this example and the following examples, for the purpose of brevity, the description of parts similar to those in example 1 will be omitted. FIG. 3 shows a schematic structural view of the camera lens assembly according to example 2 of the present disclosure.

As shown in FIG. 3, the camera lens assembly according to an exemplary embodiment of the present disclosure includes a first lens E1, a second lens E2, a stop STO, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

The working wavelength band of the camera lens assembly in this example is in the range of about 800 nm to about 1000 nm.

Table 4 shows surface type, radius of curvature, thickness, material and conic coefficient of each lens of the camera lens assembly in example 2, wherein the units for the radius of curvature and the thickness are millimeter (mm).

TABLE 4

| Surface number | Surface type | Radius of curvature | Thickness | Material Refractive index | Material Abbe number | Conic coefficient |
|---|---|---|---|---|---|---|
| OBJ | Spherical | Infinite | 1000.0000 | | | |
| S1 | Aspheric | 51.8417 | 0.9648 | 1.53 | 55.8 | 99.9900 |
| S2 | Aspheric | 1.5585 | 0.8238 | | | -0.9600 |
| S3 | Aspheric | 2.6163 | 0.4200 | 1.62 | 23.5 | -0.7393 |
| S4 | Aspheric | 2.0313 | 0.8264 | | | -0.0833 |
| STO | Spherical | Infinite | 0.0850 | | | |
| S5 | Aspheric | 18.8067 | 1.0560 | 1.53 | 55.8 | 26.1965 |
| S6 | Aspheric | -2.7705 | 0.4065 | | | 1.3029 |
| S7 | Aspheric | 3.0233 | 0.7801 | 1.53 | 55.8 | -7.4333 |
| S8 | Aspheric | 6.5733 | 0.4127 | | | -22.7501 |

TABLE 4-continued

| Surface number | Surface type | Radius of curvature | Thickness | Material Refractive index | Abbe number | Conic coefficient |
|---|---|---|---|---|---|---|
| S9 | Aspheric | −9.9173 | 0.7102 | 1.53 | 55.8 | −99.9900 |
| S10 | Aspheric | −4.8276 | 0.4009 | | | 2.6163 |
| S11 | Aspheric | 1.9280 | 1.4500 | 1.53 | 55.8 | −5.3183 |
| S12 | Aspheric | 2.9809 | 0.5905 | | | −0.1512 |
| S13 | Spherical | Infinite | 0.2100 | 1.52 | 64.2 | |
| S14 | Spherical | Infinite | 0.8531 | | | |
| S15 | Spherical | Infinite | | | | |

As can be seen from Table 4, in example 2, the object-side surface and the image-side surface of any one of the first lens E1 to the sixth lens E6 are aspheric. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 | A14 | A16 |
|---|---|---|---|---|---|---|---|
| S1 | 1.5669E−03 | −7.1605E−06 | 0.0000E+00 | 0.0000E+00 | 0.0000E+00 | 0.0000E+00 | 0.0000E+00 |
| S2 | 1.5461E−02 | −6.7337E−03 | 3.7756E−04 | −2.1638E−04 | 1.4003E−04 | 3.7021E−05 | −1.2399E−05 |
| S3 | 3.4946E−02 | −2.3179E−02 | 2.6936E−03 | 0.0000E+00 | 0.0000E+00 | 0.0000E+00 | 0.0000E+00 |
| S4 | 9.7370E−02 | −6.6705E−02 | 2.6421E−01 | −5.6865E−01 | 7.5517E−01 | −5.3454E−01 | 1.6076E−01 |
| S5 | 3.6796E−02 | −3.6799E−01 | 1.8690E+00 | −5.2531E+00 | 8.3818E+00 | −7.0904E+00 | 2.4715E+00 |
| S6 | −5.9527E−02 | 5.2770E−02 | −4.4458E−02 | 1.8599E−02 | 5.5036E−03 | −8.4650E−03 | 2.3913E−03 |
| S7 | −3.3142E−02 | 2.6736E−02 | −1.3044E−02 | 3.9835E−03 | −5.2018E−04 | −2.6957E−05 | 9.3045E−06 |
| S8 | 1.0462E−02 | −4.1849E−02 | 3.8705E−02 | −1.9498E−02 | 5.6770E−03 | −8.8558E−04 | 5.6921E−05 |
| S9 | 4.8843E−02 | −6.1866E−02 | 3.4395E−02 | −9.1933E−03 | 8.4436E−04 | 7.0166E−05 | −1.2828E−05 |
| S10 | −2.9056E−02 | 2.4966E−02 | −1.8160E−02 | 1.0483E−02 | −3.2538E−03 | 4.9375E−04 | −2.8947E−05 |
| S11 | −6.7189E−03 | −2.4285E−03 | 1.7466E−03 | −4.5858E−04 | 6.0997E−05 | −4.0675E−06 | 1.0964E−07 |
| S12 | −4.4153E−02 | 7.8862E−03 | −1.2337E−03 | 1.0332E−04 | −3.9068E−06 | 0.0000E+00 | 0.0000E+00 |

Table 6 shows a total effective focal length f of the camera lens assembly, effective focal lengths f1 to f6 of respective lens, a distance TTL along the optical axis from the object-side surface S1 of the first lens E1 to the imaging plane S15, half of a diagonal length ImgH of an effective pixel area of an electronic photosensitive element on the imaging plane S15, and half of a maximal field-of-view Semi-FOV of the camera lens assembly in example 2.

TABLE 6

| f (mm) | 1.87 | f5 (mm) | 17.00 |
|---|---|---|---|
| f1 (mm) | −3.06 | f6 (mm) | 7.01 |
| f2 (mm) | −20.19 | TTL (mm) | 9.99 |
| f3 (mm) | 4.65 | ImgH (mm) | 3.12 |
| f4 (mm) | 9.86 | Semi-FOV (°) | 87.2 |

Figure 4A:
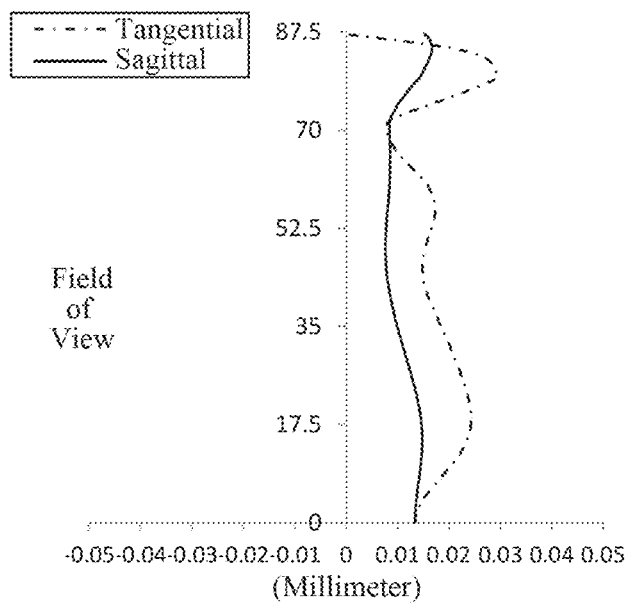
FIGS. 4A and 4B illustrate an astigmatic curve and a relative illumination curve of the camera lens assembly of the Example 2, respectively.
Figure 4B:
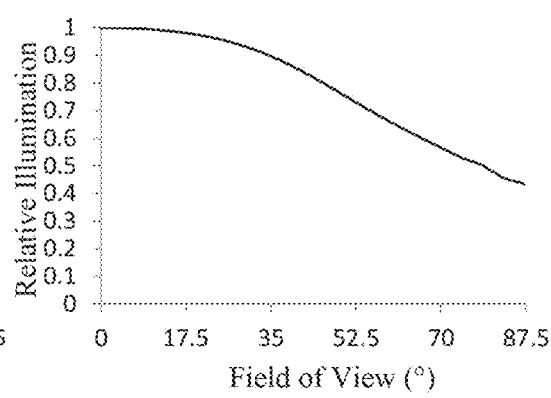

FIG. 4A illustrates an astigmatic curve of the camera lens assembly according to example 2, representing a curvature of a tangential plane and a curvature of a sagittal plane. FIG. 4B illustrates a relative illumination curve of the camera lens assembly according to example 2, representing the relative illumination corresponding to different viewing angles. It can be seen from FIG. 4A and FIG. 4B that the camera lens assembly provided in example 2 may achieve good image quality.

Example 3

A camera lens assembly according to example 3 of the present disclosure is described below with reference to FIG. 5 to FIG. 6B. FIG. 5 shows a schematic structural view of the camera lens assembly according to example 3 of the present disclosure.

As shown in FIG. 5, the camera lens assembly according to an exemplary embodiment of the present disclosure includes a first lens E1, a second lens E2, a stop STO, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a concave surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

The working wavelength band of the camera lens assembly in this example is in the range of about 800 nm to about 1000 nm.

Table 7 shows surface type, radius of curvature, thickness, material and conic coefficient of each lens of the camera lens assembly in example 3, wherein the units for the radius of curvature and the thickness are millimeter (mm).

TABLE 7

| Surface number | Surface type | Radius of curvature | Thickness | Material Refractive index | Material Abbe number | Conic coefficient |
|---|---|---|---|---|---|---|
| OBJ | Spherical | Infinite | 1000.0000 | | | |
| S1 | Aspheric | −80.0000 | 1.1097 | 1.53 | 55.8 | −99.9900 |
| S2 | Aspheric | 1.7539 | 0.7675 | | | −1.2304 |
| S3 | Aspheric | 1.8350 | 0.4762 | 1.62 | 23.5 | −1.2226 |
| S4 | Aspheric | 1.3938 | 0.7943 | | | −0.0924 |
| STO | Spherical | Infinite | 0.0781 | | | |
| S5 | Aspheric | 13.9724 | 1.1808 | 1.53 | 55.8 | −98.4665 |
| S6 | Aspheric | −2.7711 | 0.4156 | | | 2.2131 |
| S7 | Aspheric | 2.2687 | 0.6364 | 1.53 | 55.8 | −9.3447 |
| S8 | Aspheric | 4.8886 | 0.4677 | | | −31.2996 |
| S9 | Aspheric | −5.4372 | 0.6842 | 1.53 | 55.8 | −56.1254 |
| S10 | Aspheric | −4.8553 | 0.3386 | | | 2.8210 |
| S11 | Aspheric | 1.8325 | 1.4500 | 1.53 | 55.8 | −5.3292 |
| S12 | Aspheric | 3.1187 | 0.5905 | | | −0.0940 |
| S13 | Spherical | Infinite | 0.2100 | 1.52 | 64.2 | |
| S14 | Spherical | Infinite | 0.7911 | | | |
| S15 | Spherical | Infinite | | | | |

As can be seen from Table 7, in example 3, the object-side surface and the image-side surface of any one of the first lens E1 to the sixth lens E6 are aspheric. Table 8 shows high-order coefficients applicable to each aspheric surface in example 3, wherein the surface shape of each aspheric surface may be defined by the formula (1) given in the above example 1.

TABLE 8

| Surface number | A4 | A6 | A8 | A10 | A12 | A14 | A16 |
|---|---|---|---|---|---|---|---|
| S1 | 1.9266E−03 | −1.2032E−05 | 0.0000E+00 | 0.0000E+00 | 0.0000E+00 | 0.0000E+00 | 0.0000E+00 |
| S2 | −3.8757E−04 | −5.5188E−03 | −1.9354E−03 | 3.3592E−03 | −1.3545E−03 | 2.7579E−04 | −2.2796E−05 |
| S3 | 2.1661E−02 | −1.9365E−02 | 2.9018E−03 | 0.0000E+00 | 0.0000E+00 | 0.0000E+00 | 0.0000E+00 |
| S4 | 8.1592E−02 | −1.3541E−01 | 6.8303E−01 | −1.7186E+00 | 2.5184E+00 | −2.0078E+00 | 6.9115E−01 |
| S5 | 3.3871E−02 | −3.8519E−01 | 2.0322E+00 | −5.9396E+00 | 9.8211E+00 | −8.5758E+00 | 3.0717E+00 |
| S6 | −9.7708E−02 | 9.7070E−02 | −9.3418E−02 | 5.6717E−02 | −1.3693E−02 | −2.1874E−03 | 1.3395E−03 |
| S7 | −1.6312E−02 | 3.4585E−03 | 5.6847E−05 | −1.1692E−03 | 9.6470E−04 | −2.7375E−04 | 2.5609E−05 |
| S8 | 2.2347E−02 | −5.6048E−02 | 4.4133E−02 | −2.1924E−02 | 6.9003E−03 | −1.1826E−03 | 8.2298E−05 |
| S9 | 5.5178E−02 | −7.0779E−02 | 4.0918E−02 | −1.4120E−02 | 3.1226E−03 | −4.2228E−04 | 2.5887E−05 |
| S10 | −1.9066E−02 | 1.3607E−02 | −1.0054E−02 | 6.5827E−03 | −2.0971E−03 | 3.1160E−04 | −1.7661E−05 |
| S11 | −9.5164E−03 | −4.9435E−03 | 3.2227E−03 | −8.1158E−04 | 1.0696E−04 | −7.1475E−06 | 1.9116E−07 |
| S12 | −4.6205E−02 | 8.4830E−03 | −1.3074E−03 | 1.0650E−04 | −3.6526E−06 | 0.0000E+00 | 0.0000E+00 |

Table 9 shows a total effective focal length f of the camera lens assembly, effective focal lengths f1 to f6 of respective lens, a distance TTL along the optical axis from the object-side surface S1 of the first lens E1 to the imaging plane S15, half of a diagonal length ImgH of an effective pixel area of an electronic photosensitive element on the imaging plane S15, and half of a maximal field-of-view Semi-FOV of the camera lens assembly in example 3.

TABLE 9

| f (mm) | 1.87 | f5 (mm) | 61.14 |
|---|---|---|---|
| f1 (mm) | −3.24 | f6 (mm) | 6.06 |
| f2 (mm) | −15.92 | TTL (mm) | 9.99 |
| f3 (mm) | 4.49 | ImgH (mm) | 3.13 |
| f4 (mm) | 7.40 | Semi-FOV (°) | 87.5 |

FIG. 6A illustrates an astigmatic curve of the camera lens assembly according to example 3, representing a curvature of a tangential plane and a curvature of a sagittal plane. FIG. 6B illustrates a relative illumination curve of the camera lens assembly according to example 3, representing the relative illumination corresponding to different viewing angles. It can be seen from FIG. 6A and FIG. 6B that the camera lens assembly provided in example 3 may achieve good image quality.

Example 4

Figure 7:
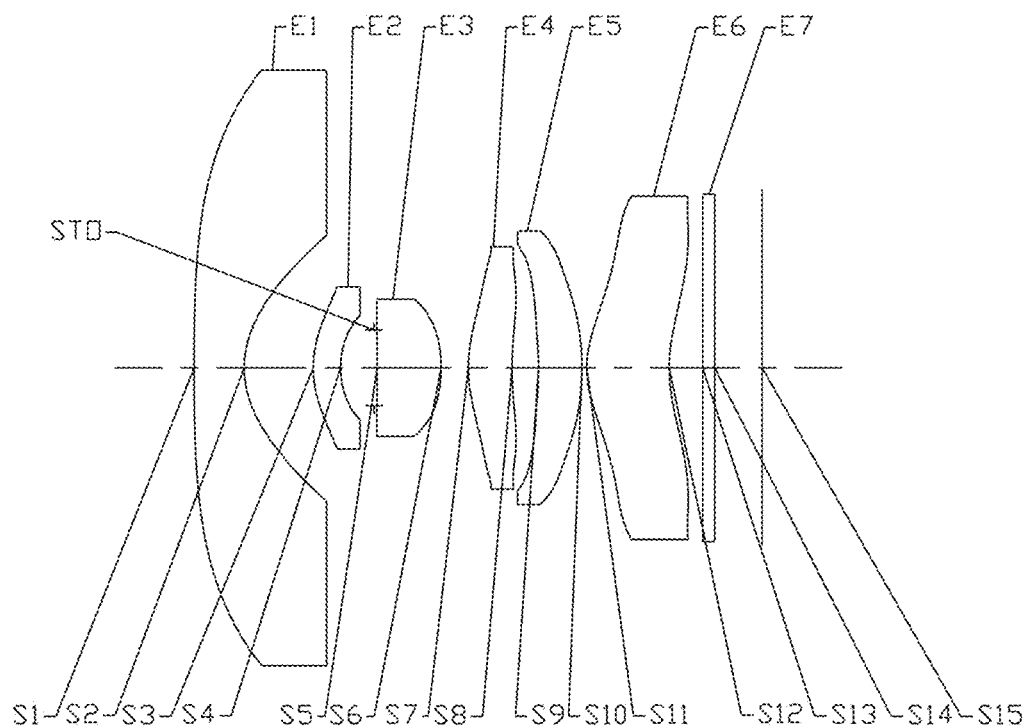
FIG. 7 illustrates a schematic structural view of a camera lens assembly according to Example 4 of the present disclosure.

A camera lens assembly according to example 4 of the present disclosure is described below with reference to FIG. 7 to FIG. 8B. FIG. 7 shows a schematic structural view of the camera lens assembly according to example 4 of the present disclosure.

As shown in FIG. 7, the camera lens assembly according to an exemplary embodiment of the present disclosure includes a first lens E1, a second lens E2, a stop STO, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

The working wavelength band of the camera lens assembly in this example is in the range of about 800 nm to about 1000 nm.

Table 10 shows surface type, radius of curvature, thickness, material and conic coefficient of each lens of the camera lens assembly in example 4, wherein the units for the radius of curvature and the thickness are millimeter (mm).

Table 12 shows a total effective focal length f of the camera lens assembly, effective focal lengths f1 to f6 of respective lens, a distance TTL along the optical axis from the object-side surface S1 of the first lens E1 to the imaging plane S15, half of a diagonal length ImgH of an effective pixel area of an electronic photosensitive element on the imaging plane S15, and half of a maximal field-of-view Semi-FOV of the camera lens assembly in example 4.

TABLE 12

| f (mm)  | 1.87   | f5 (mm)      | −158.21 |
| ------- | ------ | ------------ | ------- |
| f1 (mm) | −3.43  | f6 (mm)      | 5.45    |
| f2 (mm) | −21.88 | TTL (mm)     | 9.99    |
| f3 (mm) | 5.13   | ImgH (mm)    | 3.13    |
| f4 (mm) | 6.84   | Semi-FOV (°) | 87.5    |

Figure 8A:
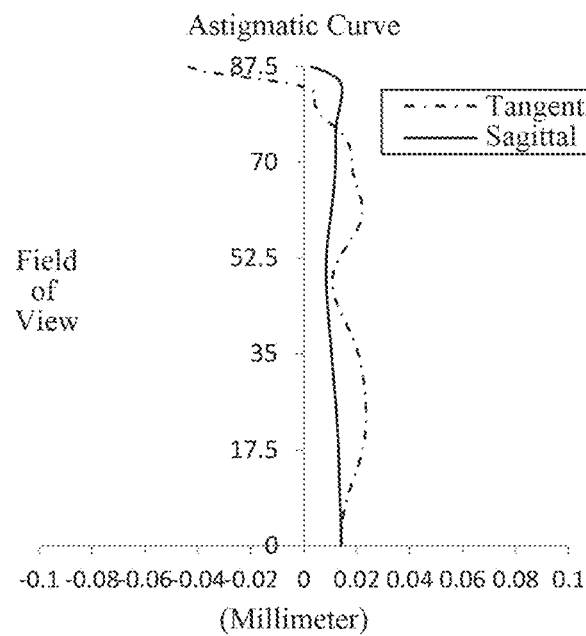
FIGS. 8A and 8B illustrate an astigmatic curve and a relative illumination curve of the camera lens assembly of the Example 4, respectively.
Figure 8B:
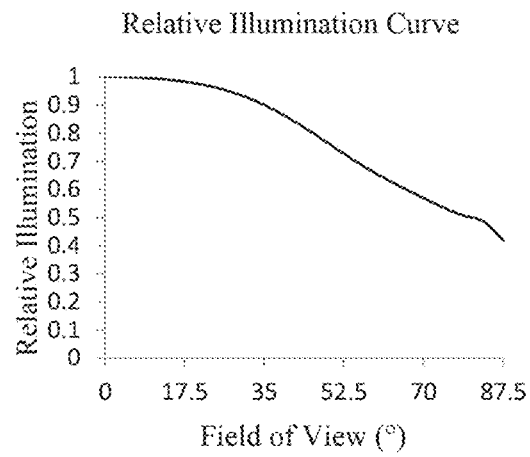

FIG. 8A illustrates an astigmatic curve of the camera lens assembly according to example 4, representing a curvature of a tangential plane and a curvature of a sagittal plane. FIG. 8B illustrates a relative illumination curve of the camera lens assembly according to example 4, representing the relative illumination corresponding to different viewing angles. It can be seen from FIG. 8A and FIG. 8B that the camera lens assembly provided in example 4 may achieve good image quality.

TABLE 10

| Surface number | Surface type | Radius of curvature | Thickness | Material Refractive index | Material Abbe number | Conic coefficient |
| --- | --- | --- | --- | --- | --- | --- |
| OBJ | Spherical | Infinite | 1000.0000 | | | |
| S1  | Aspheric | 51.3123 | 0.8827 | 1.53 | 55.8 | 80.9185 |
| S2  | Aspheric | 1.7386 | 1.2142 | | | −1.0871 |
| S3  | Aspheric | 1.9317 | 0.4799 | 1.62 | 23.5 | −1.7174 |
| S4  | Aspheric | 1.5302 | 0.5877 | | | −0.3195 |
| STO | Spherical | Infinite | 0.0563 | | | |
| S5  | Aspheric | −105.6164 | 1.1231 | 1.53 | 55.8 | −99.9900 |
| S6  | Aspheric | −2.6504 | 0.4790 | | | 2.4279 |
| S7  | Aspheric | 2.3526 | 0.7699 | 1.53 | 55.8 | −9.4336 |
| S8  | Aspheric | 5.9971 | 0.4645 | | | −39.1353 |
| S9  | Aspheric | −4.3889 | 0.7634 | 1.53 | 55.8 | −63.0516 |
| S10 | Aspheric | −4.9108 | 0.0842 | | | 2.7760 |
| S11 | Aspheric | 1.6651 | 1.4500 | 1.53 | 55.8 | −5.4714 |
| S12 | Aspheric | 2.7652 | 0.5906 | | | −0.2997 |
| S13 | Spherical | Infinite | 0.2100 | 1.52 | 64.2 | |
| S14 | Spherical | Infinite | 0.8344 | | | |
| S15 | Spherical | Infinite | | | | |

As can be seen from Table 10, in example 4, the object-side surface and the image-side surface of any one of the first lens E1 to the sixth lens E6 are aspheric. Table 11 shows high-order coefficients applicable to each aspheric surface in example 4, wherein the surface shape of each aspheric surface may be defined by the formula (1) given in the above example 1.

TABLE 11

| Surface number | A4 | A6 | A8 | A10 | A12 | A14 | A16 |
| --- | --- | --- | --- | --- | --- | --- | --- |
| S1  | 1.2949E−03  | −8.3570E−06 | 0.0000E+00  | 0.0000E+00  | 0.0000E+00  | 0.0000E+00  | 0.0000E+00  |
| S2  | 6.8868E−03  | −3.6145E−03 | −2.9314E−04 | 1.4622E−04  | 6.1427E−05  | −2.1257E−05 | 1.6719E−06  |
| S3  | 1.6856E−02  | −2.9755E−02 | 7.0073E−03  | 0.0000E+00  | 0.0000E+00  | 0.0000E+00  | 0.0000E+00  |
| S4  | 6.4502E−02  | −1.7936E−01 | 8.6103E−01  | −2.3820E+00 | 3.9007E+00  | −3.3904E+00 | 1.2450E+00  |
| S5  | 3.6364E−02  | −7.3168E−01 | 4.8747E+00  | −1.8215E+01 | 3.8446E+01  | −4.2853E+01 | 1.9603E+01  |
| S6  | −8.8074E−02 | 7.2869E−02  | −7.6347E−02 | 4.9216E−02  | −1.4390E−02 | −9.1794E−04 | 1.0099E−03  |
| S7  | −5.5379E−03 | −1.7057E−03 | 2.9045E−04  | −5.9467E−04 | 5.0862E−04  | −1.2872E−04 | 1.0435E−05  |
| S8  | 1.2814E−02  | −3.5902E−02 | 2.4478E−02  | −1.1705E−02 | 3.5186E−03  | −5.5063E−04 | 3.4110E−05  |
| S9  | 5.6579E−02  | −6.1381E−02 | 3.4077E−02  | −1.2954E−02 | 3.2879E−03  | −4.8588E−04 | 3.0345E−05  |
| S10 | −1.8081E−02 | 1.5869E−02  | −9.2783E−03 | 4.1333E−03  | −9.9505E−04 | 1.1455E−04  | −4.9661E−06 |
| S11 | −7.5024E−03 | −3.3703E−03 | 1.7705E−03  | −4.3553E−04 | 6.0995E−05  | −4.3697E−06 | 1.2390E−07  |
| S12 | −4.9202E−02 | 8.9282E−03  | −1.5092E−03 | 1.3816E−04  | −5.1576E−06 | 0.0000E+00  | 0.0000E+00  |

Example 5

Figure 9:
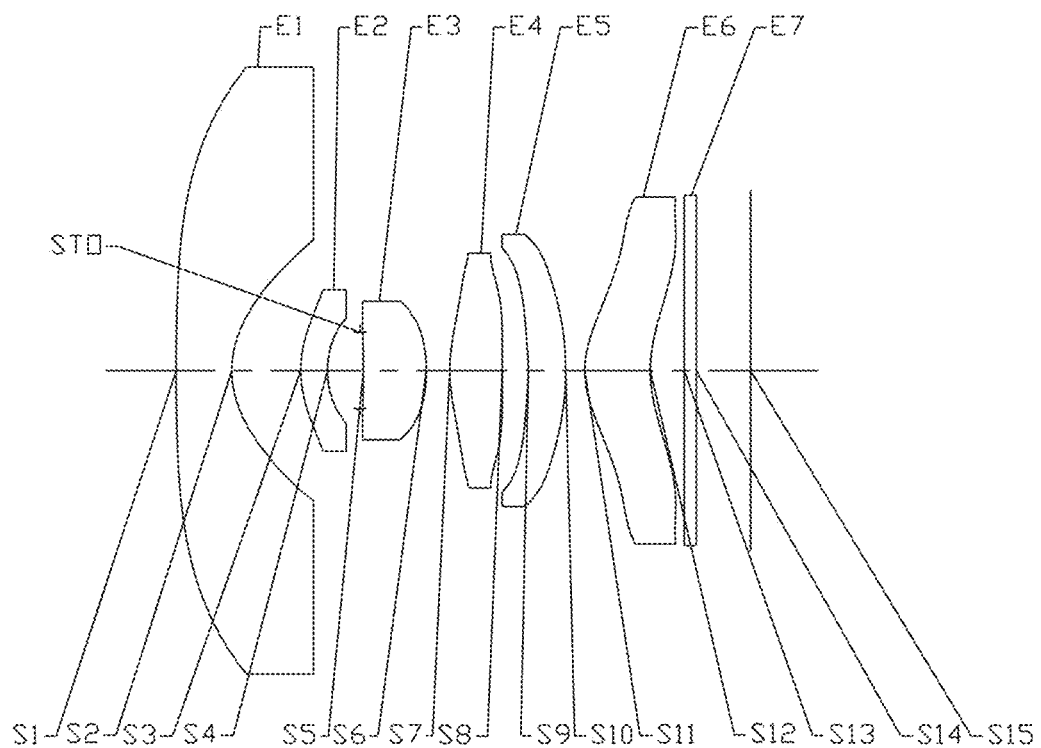
FIG. 9 illustrates a schematic structural view of a camera lens assembly according to Example 5 of the present disclosure.

A camera lens assembly according to example 5 of the present disclosure is described below with reference to FIG. 9 to FIG. 10B. FIG. 9 shows a schematic structural view of the camera lens assembly according to example 5 of the present disclosure.

As shown in FIG. 9, the camera lens assembly according to an exemplary embodiment of the present disclosure includes a first lens E1, a second lens E2, a stop STO, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

The working wavelength band of the camera lens assembly in this example is in the range of about 800 nm to about 1000 nm.

Table 13 shows surface type, radius of curvature, thickness, material and conic coefficient of each lens of the camera lens assembly in example 5, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | Spherical | Infinite | 1000.0000 | | | |
| S1 | Aspheric | 53.4368 | 0.9668 | 1.53 | 55.8 | 87.9698 |
| S2 | Aspheric | 1.7253 | 1.1990 | | | −1.0099 |
| S3 | Aspheric | 1.9860 | 0.4647 | 1.62 | 23.5 | −1.5190 |
| S4 | Aspheric | 1.5632 | 0.5686 | | | −0.3570 |
| STO | Spherical | Infinite | 0.0559 | | | |
| S5 | Aspheric | −34.9340 | 1.0947 | 1.53 | 55.8 | 10.2988 |
| S6 | Aspheric | −2.8994 | 0.4084 | | | 2.7794 |
| S7 | Aspheric | 2.6873 | 0.9120 | 1.53 | 55.8 | −1.05E+01 |
| S8 | Aspheric | −90.0000 | 0.4532 | | | −99.9900 |
| S9 | Aspheric | −3.9711 | 0.6500 | 1.53 | 55.8 | −48.0595 |
| S10 | Aspheric | −5.2794 | 0.3328 | | | 2.8752 |
| S11 | Aspheric | 1.5479 | 1.1393 | 1.53 | 55.8 | −4.0337 |
| S12 | Aspheric | 2.3140 | 0.5906 | | | −0.5257 |
| S13 | Spherical | Infinite | 0.2100 | 1.52 | 64.2 | |
| S14 | Spherical | Infinite | 0.9445 | | | |
| S15 | Spherical | Infinite | | | | |

As can be seen from Table 13, in example 5, the object-side surface and the image-side surface of any one of the first lens E1 to the sixth lens E6 are aspheric. Table 14 shows high-order coefficients applicable to each aspheric surface in example 5, wherein the surface shape of each aspheric surface may be defined by the formula (1) given in the above example 1.

TABLE 14

| Surface number | A4 | A6 | A8 | A10 | A12 | A14 | A16 |
|---|---|---|---|---|---|---|---|
| S1 | 1.3244E−03 | −8.4748E−06 | 0.0000E+00 | 0.0000E+00 | 0.0000E+00 | 0.0000E+00 | 0.0000E+00 |
| S2 | 4.8378E−03 | −4.0617E−03 | 6.7462E−04 | −3.9563E−04 | 2.3919E−04 | −5.1832E−05 | 3.7070E−06 |
| S3 | 7.9748E−03 | −2.8235E−02 | 7.1225E−03 | 0.0000E+00 | 0.0000E+00 | 0.0000E+00 | 0.0000E+00 |
| S4 | 6.1067E−02 | −1.7855E−01 | 9.0098E−01 | −2.5846E+00 | 4.3361E+00 | −3.8376E+00 | 1.4289E+00 |
| S5 | 3.5130E−02 | −7.6033E−01 | 5.1901E+00 | −1.9844E+01 | 4.2853E+01 | −4.8853E+01 | 2.2842E+01 |
| S6 | −1.0139E−01 | 7.2180E−02 | −6.6468E−02 | 3.3191E−02 | −2.7271E−02 | −5.2800E−03 | 1.4972E−03 |
| S7 | −2.1937E−02 | 9.2403E−03 | −7.1318E−03 | 3.5333E−03 | −7.3663E−04 | 4.9424E−05 | 1.2331E−06 |
| S8 | 2.1904E−02 | −5.1896E−02 | 3.1666E−02 | −1.2979E−02 | 3.6882E−03 | −5.9368E−04 | 3.9621E−05 |
| S9 | 5.0548E−02 | −5.0213E−02 | 1.9444E−02 | −4.2808E−03 | 6.9443E−04 | −1.0762E−04 | 9.0469E−06 |
| S10 | −8.2343E−03 | 1.0764E−02 | −7.8021E−03 | 3.8916E−03 | −1.0467E−03 | 1.3573E−04 | −6.7597E−06 |
| S11 | −5.3153E−03 | −3.8325E−03 | 1.8880E−03 | −5.0345E−04 | 7.3771E−05 | −5.3260E−06 | 1.4915E−07 |
| S12 | −5.4109E−02 | 1.0305E−02 | −1.9057E−03 | 1.8091E−04 | −6.6794E−06 | 0.0000E+00 | 0.0000E+00 |

Table 15 shows a total effective focal length f of the camera lens assembly, effective focal lengths f1 to f6 of respective lens, a distance TTL along the optical axis from the object-side surface S1 of the first lens E1 to the imaging plane S15, half of a diagonal length ImgH of an effective pixel area of an electronic photosensitive element on the imaging plane S15, and half of a maximal field-of-view Semi-FOV of the camera lens assembly in example 5.

TABLE 15

| f (mm)  | 1.87   | f5 (mm)     | −36.65 |
|---------|--------|-------------|--------|
| f1 (mm) | −3.40  | f6 (mm)     | 5.85   |
| f2 (mm) | −20.43 | TTL (mm)    | 9.99   |
| f3 (mm) | 5.92   | ImgH (mm)   | 3.13   |
| f4 (mm) | 4.96   | Semi-FOV (°)| 87.5   |

Figures 10A, 10B:
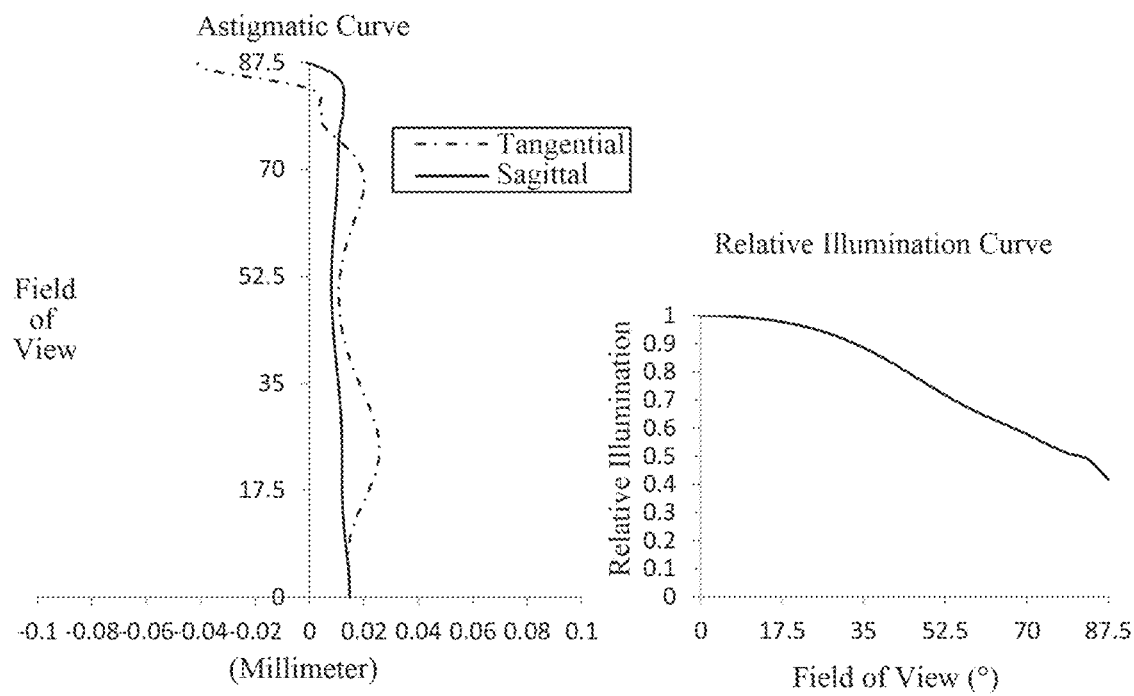
FIGS. 10A and 10B illustrate an astigmatic curve and a relative illumination curve of the camera lens assembly of the Example 5, respectively.

FIG. 10A illustrates an astigmatic curve of the camera lens assembly according to example 5, representing a curvature of a tangential plane and a curvature of a sagittal plane. FIG. 10B illustrates a relative illumination curve of the camera lens assembly according to example 5, representing the relative illumination corresponding to different viewing angles. It can be seen from FIG. 10A and FIG. 10B that the camera lens assembly provided in example 5 may achieve good image quality.

Example 6

A camera lens assembly according to example 6 of the present disclosure is described below with reference to FIG. 11 to FIG. 12B. FIG. 11 shows a schematic structural view of the camera lens assembly according to example 6 of the present disclosure.

As shown in FIG. 11, the camera lens assembly according to an exemplary embodiment of the present disclosure includes a first lens E1, a second lens E2, a stop STO, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

The working wavelength band of the camera lens assembly in this example is in the range of about 800 nm to about 1000 nm.

Table 16 shows surface type, radius of curvature, thickness, material and conic coefficient of each lens of the camera lens assembly in example 6, wherein the units for the radius of curvature and the thickness are millimeter (mm).

TABLE 16

| Surface number | Surface type | Radius of curvature | Thickness | Material Refractive index | Abbe number | Conic coefficient |
|---|---|---|---|---|---|---|
| OBJ | Spherical | Infinite | 1000.0000 | | | |
| S1 | Aspheric | 47.3234 | 1.1734 | 1.53 | 55.8 | 68.1805 |
| S2 | Aspheric | 1.5810 | 0.9888 | | | −1.0496 |
| S3 | Aspheric | 2.0233 | 0.4737 | 1.62 | 23.5 | −1.7784 |
| S4 | Aspheric | 1.6177 | 0.6029 | | | −0.1242 |
| STO | Spherical | Infinite | 0.0617 | | | |
| S5 | Aspheric | 1114.5860 | 1.0743 | 1.53 | 55.8 | −99.9900 |
| S6 | Aspheric | −2.3427 | 0.4482 | | | 1.9879 |
| S7 | Aspheric | 2.2302 | 0.6251 | 1.53 | 55.8 | −11.4277 |
| S8 | Aspheric | 2.7575 | 0.2973 | | | −12.6958 |
| S9 | Aspheric | 38.5043 | 0.9457 | 1.53 | 55.8 | 82.6308 |
| S10 | Aspheric | −4.7855 | 0.3561 | | | 2.6817 |
| S11 | Aspheric | 2.0204 | 1.3708 | 1.53 | 55.8 | −5.8055 |
| S12 | Aspheric | 2.8214 | 0.5905 | | | −0.2747 |
| S13 | Spherical | Infinite | 0.2100 | 1.52 | 64.2 | |
| S14 | Spherical | Infinite | 0.7725 | | | |
| S15 | Spherical | Infinite | | | | |

As can be seen from Table 16, in example 6, the object-side surface and the image-side surface of any one of the first lens E1 to the sixth lens E6 are aspheric. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 | A14 | A16 |
|---|---|---|---|---|---|---|---|
| S1 | 1.2403E−03 | −8.7272E−06 | 0.0000E+00 | 0.0000E+00 | 0.0000E+00 | 0.0000E+00 | 0.0000E+00 |
| S2 | 1.5361E−02 | −7.2896E−03 | 1.8740E−03 | −1.8662E−03 | 1.0462E−03 | −2.3724E−04 | 1.8997E−05 |
| S3 | 3.0624E−02 | −3.4178E−02 | 7.1144E−03 | 0.0000E+00 | 0.0000E+00 | 0.0000E+00 | 0.0000E+00 |
| S4 | 8.1784E−02 | −1.6804E−01 | 7.9320E−01 | −2.2051E+00 | 3.6935E+00 | −3.2906E+00 | 1.2423E+00 |
| S5 | 3.3945E−02 | −6.8086E−01 | 4.4276E+00 | −1.6169E+01 | 3.3357E+01 | −3.6330E+01 | 1.6229E+01 |
| S6 | −9.3465E−02 | 1.1142E−01 | −1.3860E−01 | 1.1636E−01 | −5.3110E−02 | 8.9465E−03 | 6.8670E−04 |
| S7 | −1.3441E−02 | −7.3627E−04 | −6.3023E−04 | 1.5496E−03 | −4.5745E−04 | 3.5111E−05 | 7.6310E−07 |
| S8 | 6.3100E−03 | −2.8234E−02 | 2.2757E−02 | −1.2361E−02 | 4.0744E−03 | −6.9475E−04 | 4.6929E−05 |
| S9 | 3.3704E−02 | −4.0311E−02 | 3.0519E−02 | −1.4777E−02 | 4.2258E−03 | −6.6200E−04 | 4.3489E−05 |
| S10 | −4.1325E−02 | 3.3237E−02 | −1.5755E−02 | 6.4782E−03 | −1.6616E−03 | 2.1624E−04 | −1.0902E−05 |
| S11 | −1.5810E−02 | 4.3852E−04 | 6.7938E−04 | −1.9894E−04 | 2.9923E−05 | −2.2609E−06 | 6.7124E−08 |
| S12 | −5.2796E−02 | 8.6321E−03 | −1.2122E−03 | 9.7540E−05 | −3.3834E−06 | 0.0000E+00 | 0.0000E+00 |

Table 18 shows a total effective focal length f of the camera lens assembly, effective focal lengths f1 to f6 of respective lens, a distance TTL along the optical axis from the object-side surface S1 of the first lens E1 to the imaging plane S15, half of a diagonal length ImgH of an effective pixel area of an electronic photosensitive element on the imaging plane S15, and half of a maximal field-of-view Semi-FOV of the camera lens assembly in example 6.

TABLE 18

| f (mm) | 1.87 | f5 (mm) | 8.13 |
|---|---|---|---|
| f1 (mm) | −3.13 | f6 (mm) | 8.47 |
| f2 (mm) | −23.52 | TTL (mm) | 9.99 |
| f3 (mm) | 4.43 | ImgH (mm) | 3.13 |
| f4 (mm) | 15.68 | Semi-FOV (°) | 87.5 |

FIG. 12A illustrates an astigmatic curve of the camera lens assembly according to example 6, representing a curvature of a tangential plane and a curvature of a sagittal plane. FIG. 12B illustrates a relative illumination curve of the camera lens assembly according to example 6, representing the relative illumination corresponding to different viewing angles. It can be seen from FIG. 12A and FIG. 12B that the camera lens assembly provided in example 6 may achieve good image quality.

Example 7

A camera lens assembly according to example 7 of the present disclosure is described below with reference to FIG. 13 to FIG. 14B. FIG. 13 shows a schematic structural view of the camera lens assembly according to example 7 of the present disclosure.

As shown in FIG. 13, the camera lens assembly according to an exemplary embodiment of the present disclosure includes a first lens E1, a second lens E2, a stop STO, a third lens E3, a fourth lens E4, a fifth lens E5, a sixth lens E6, an optical filter E7 and an imaging plane S15, which are sequentially arranged from an object side to an image side along an optical axis.

The first lens E1 has negative refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a convex surface. The sixth lens E6 has positive refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

The working wavelength band of the camera lens assembly in this example is in the range of about 800 nm to about 1000 nm.

Table 19 shows surface type, radius of curvature, thickness, material and conic coefficient of each lens of the camera lens assembly in example 7, wherein the units for the radius of curvature and the thickness are millimeter (mm).

TABLE 19

| Surface number | Surface type | Radius of curvature | Thickness | Material | | Conic coefficient |
| | | | | Refractive index | Abbe number | |
|---|---|---|---|---|---|---|
| OBJ | Spherical | Infinite | 1000.0000 | | | |
| S1 | Aspheric | 44.4393 | 0.9840 | 1.53 | 55.8 | 60.7497 |
| S2 | Aspheric | 1.6961 | 1.1084 | | | −1.0993 |
| S3 | Aspheric | 1.9940 | 0.4688 | 1.62 | 23.5 | −1.5357 |
| S4 | Aspheric | 1.5108 | 0.6293 | | | −0.0461 |
| STO | Spherical | Infinite | 0.0626 | | | |
| S5 | Aspheric | −273.6515 | 1.1054 | 1.53 | 55.8 | −99.9900 |
| S6 | Aspheric | −2.3412 | 0.4505 | | | 1.8949 |
| S7 | Aspheric | 2.3227 | 0.7891 | 1.53 | 55.8 | −10.7332 |
| S8 | Aspheric | 3.1163 | 0.3297 | | | −12.7129 |
| S9 | Aspheric | 58.5452 | 0.9042 | 1.53 | 55.8 | −99.9900 |

TABLE 19-continued

| Surface number | Surface type | Radius of curvature | Thickness | Material Refractive index | Abbe number | Conic coefficient |
|---|---|---|---|---|---|---|
| S10 | Aspheric | −4.8976 | 0.2549 | | | 2.4954 |
| S11 | Aspheric | 2.0235 | 1.2909 | 1.53 | 55.8 | −5.4782 |
| S12 | Aspheric | 2.6922 | 0.5905 | | | −0.3373 |
| S13 | Spherical | Infinite | 0.2100 | 1.52 | 64.2 | |
| S14 | Spherical | Infinite | 0.8125 | | | |
| S15 | Spherical | Infinite | | | | |

As can be seen from Table 19, in example 7, the object-side surface and the image-side surface of any one of the first lens E1 to the sixth lens E6 are aspheric. Table 20 shows high-order coefficients applicable to each aspheric surface in example 7, wherein the surface shape of each aspheric surface may be defined by the formula (1) given in the above example 1.

TABLE 20

| Surface number | A4 | A6 | A8 | A10 | A12 | A14 | A16 |
|---|---|---|---|---|---|---|---|
| S1 | 1.2169E−03 | −7.5778E−06 | 0.0000E+00 | 0.0000E+00 | 0.0000E+00 | 0.0000E+00 | 0.0000E+00 |
| S2 | 1.3264E−02 | −3.1907E−03 | −1.7399E−03 | 5.1376E−04 | 8.1654E−05 | −3.9222E−05 | 3.4064E−06 |
| S3 | 3.1206E−02 | −3.4094E−02 | 6.8593E−03 | 0.0000E+00 | 0.0000E+00 | 0.0000E+00 | 0.0000E+00 |
| S4 | 8.9257E−02 | −2.3116E−01 | 1.1425E+00 | −3.2946E+00 | 5.6192E+00 | −5.0693E+00 | 1.9179E+00 |
| S5 | 3.4758E−02 | −6.8627E−01 | 4.4545E+00 | −1.6236E+01 | 3.3443E+01 | −3.6372E+01 | 1.6228E+01 |
| S6 | −9.7433E−02 | 1.0392E−01 | −1.1837E−01 | 9.1187E−02 | −3.8504E−02 | 5.7679E−03 | 6.2938E−04 |
| S7 | −1.9591E−02 | 8.4483E−03 | −5.0070E−03 | 2.4026E−03 | −5.2098E−04 | 3.6338E−05 | 7.9273E−07 |
| S8 | −2.4605E−04 | −2.3907E−02 | 2.0174E−02 | −1.0669E−02 | 3.3449E−03 | −5.4244E−04 | 3.4955E−05 |
| S9 | 4.3327E−02 | −4.9661E−02 | 3.2583E−02 | −1.3834E−02 | 3.5526E−03 | −5.0514E−04 | 3.0185E−05 |
| S10 | −3.3140E−02 | 2.7989E−02 | −1.3275E−02 | 5.1938E−03 | −1.2587E−03 | 1.5673E−04 | −7.6864E−06 |
| S11 | −2.5125E−02 | 4.8594E−03 | −8.2862E−04 | 1.4158E−04 | −1.3388E−05 | 5.5893E−07 | −6.6044E−09 |
| S12 | −6.0891E−02 | 1.1325E−02 | −1.6984E−03 | 1.4581E−04 | −5.3341E−06 | 0.0000E+00 | 0.0000E+00 |

Table 21 shows a total effective focal length f of the camera lens assembly, effective focal lengths f1 to f6 of respective lens, a distance TTL along the optical axis from the object-side surface S1 of the first lens E1 to the imaging plane S15, half of a diagonal length ImgH of an effective pixel area of an electronic photosensitive element on the imaging plane S15, and half of a maximal field-of-view Semi-FOV of the camera lens assembly in example 7.

TABLE 21

| f (mm) | 1.87 | f5 (mm) | 8.61 |
|---|---|---|---|
| f1 (mm) | −3.37 | f6 (mm) | 9.26 |
| f2 (mm) | −15.98 | TTL (mm) | 9.99 |
| f3 (mm) | 4.47 | ImgH (mm) | 3.13 |
| f4 (mm) | 12.86 | Semi-FOV (°) | 87.5 |

FIG. 14A illustrates an astigmatic curve of the camera lens assembly according to example 7, representing a curvature of a tangential plane and a curvature of a sagittal plane. FIG. 14B illustrates a relative illumination curve of the camera lens assembly according to example 7, representing the relative illumination corresponding to different viewing angles. It can be seen from FIG. 14A and FIG. 14B that the camera lens assembly provided in example 7 may achieve good image quality.

In view of the above, examples 1 to 7 respectively satisfy the relationship shown in Table 22 below.

TABLE 22

| | Example | | | | | | |
|---|---|---|---|---|---|---|---|
| Condition | 1 | 2 | 3 | 4 | 5 | 6 | 7 |
| f1/f3 | −0.57 | −0.66 | −0.72 | −0.67 | −0.57 | −0.71 | −0.75 |
| f2/f3 | −7.96 | −4.34 | −3.54 | −4.26 | −3.45 | −5.31 | −3.58 |

TABLE 22-continued

| | Example | | | | | | |
|---|---|---|---|---|---|---|---|
| Condition | 1 | 2 | 3 | 4 | 5 | 6 | 7 |
| ImgH$^2$/f (mm) | 5.59 | 5.23 | 5.26 | 5.26 | 5.26 | 5.26 | 5.26 |
| R2/f | 0.76 | 0.84 | 0.94 | 0.93 | 0.92 | 0.85 | 0.91 |
| (CT2 + CT3 + CT4 + CT5)/TD | 0.32 | 0.36 | 0.35 | 0.38 | 0.38 | 0.37 | 0.39 |
| CT4/CT6 | 0.43 | 0.54 | 0.44 | 0.53 | 0.80 | 0.46 | 0.61 |
| N5 | 1.53 | 1.53 | 1.53 | 1.53 | 1.53 | 1.53 | 1.53 |
| SL/TTL | 0.68 | 0.70 | 0.68 | 0.68 | 0.68 | 0.68 | 0.68 |
| DT11/ImgH | 1.43 | 1.47 | 1.62 | 1.67 | 1.68 | 1.66 | 1.66 |
| DT62/ImgH | 0.99 | 0.96 | 0.96 | 0.96 | 0.96 | 0.97 | 0.96 |
| DT12/DT21 | 1.31 | 1.21 | 1.35 | 1.64 | 1.62 | 1.44 | 1.57 |
| CT2/ET2 | 1.10 | 1.01 | 1.18 | 1.20 | 1.16 | 1.19 | 1.17 |
| SAG11/SAG12 | 0.65 | 0.80 | 0.81 | 0.82 | 0.86 | 0.90 | 0.86 |
| SAG12/CT1 | 1.53 | 1.19 | 1.03 | 1.64 | 1.47 | 1.08 | 1.41 |
| CRAmax (°) | 13.73 | 14.27 | 13.76 | 13.42 | 12.93 | 13.68 | 14.80 |

The present disclosure further provides a camera apparatus, having an electronic photosensitive element which may be a photosensitive Charge-Coupled Device (CCD) or a Complementary Metal-Oxide Semiconductor (CMOS). The camera apparatus may be an independent camera device such as a digital camera, or may be a camera module integrated in a mobile electronic device, such as a mobile phone or a tablet computer. The camera apparatus is equipped with the camera lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, comprising, sequentially from an object side to an image side along an optical axis, a first lens, a second lens, a third lens, a fourth lens, a fifth lens and a sixth lens, wherein, the first lens has negative refractive power, and an image-side surface of the first lens is a concave surface;

the second lens has negative refractive power, an object-side surface of the second lens is a convex surface, and an image-side surface of the second lens is a concave surface;

the third lens has positive refractive power, and an image-side surface of the third lens is a convex surface;

the fourth lens has refractive power;

the fifth lens has refractive power; and the sixth lens has positive refractive power, wherein 5.59 mm≥ImgH$^2$/f>4.5 mm, 1.43≤DT11/ImgH<1.8, −1<f1/f3<−0.5, and −8<f2/f3<−3, where ImgH is half of a diagonal length of an effective pixel area of an electronic photosensitive element on an imaging plane of the camera lens assembly, f is a total effective focal length of the camera lens assembly, DT11 is an effective half-aperture of an object-side surface of the first lens, f1 is an effective focal length of the first lens, f3 is an effective focal length of the third lens, and f2 is an effective focal length of the second lens.

2. The camera lens assembly according to claim 1, wherein 0.5<R2/f<1, where R2 is a radius of curvature of the image-side surface of the first lens.

3. The camera lens assembly according to claim 1, wherein (CT2+CT3+CT4+CT5)/TD<0.5, where CT2 is a center thickness of the second lens along the optical axis, CT3 is a center thickness of the third lens along the optical axis, CT4 is a center thickness of the fourth lens along the optical axis, CT5 is a center thickness of the fifth lens along the optical axis, and TD is a distance along the optical axis from the object-side surface of the first lens to an image-side surface of the sixth lens.

4. The camera lens assembly according to claim 1, wherein 0.3<CT4/CT6<0.85, where CT4 is a center thickness of the fourth lens along the optical axis, and CT6 is a center thickness of the sixth lens along the optical axis.

5. The camera lens assembly according to claim 1, wherein N5<1.6, where N5 is a refractive index of the fifth lens.

6. The camera lens assembly according to claim 1, wherein 0.8<DT62/ImgH<1.1, where DT62 is an effective half-aperture of an image-side surface of the sixth lens.

7. The camera lens assembly according to claim 1, wherein 1.2<DT12/DT21<1.7, where DT12 is an effective half-aperture of the image-side surface of the first lens, and DT21 is an effective half-aperture of the object-side surface of the second lens.

8. The camera lens assembly according to claim 1, wherein 1<CT2/ET2<1.3, where CT2 is a center thickness of the second lens along the optical axis, and ET2 is an edge thickness of the second lens.

9. The camera lens assembly according to claim 1, wherein 0.5<SAG11/SAG12<1, where SAG11 is an on-axis distance from an intersection of the object-side surface of the first lens and the optical axis to a vertex of a maximum effective half-aperture of the object-side surface of the first lens, and SAG12 is an on-axis distance from an intersection of the image-side surface of the first lens and the optical axis to a vertex of a maximum effective half-aperture of the image-side surface of the first lens.

10. The camera lens assembly according to claim 1, wherein 1<SAG12/CT1<1.7, where SAG12 is an on-axis distance from an intersection of the image-side surface of the first lens and the optical axis to a vertex of a maximum effective half-aperture of the image-side surface of the first lens, and CT1 is a center thickness of the first lens along the optical axis.

11. The camera lens assembly according to claim 1, wherein the camera lens assembly further comprises a stop, and 0.6<SL/TTL<1, where SL is a distance along the optical axis from the stop to an imaging plane of the camera lens assembly, and TTL is a distance along the optical axis from the object-side surface of the first lens to the imaging plane of the camera lens assembly.

12. The camera lens assembly according to claim 1, wherein 10°<CRAmax<20°, where CRAmax is a maximum incident angle of a chief ray incident onto an electronic photosensitive element on an imaging plane of the camera lens assembly.

13. The camera lens assembly according to claim 1, wherein 4.96 mm<f4<15.68 mm, f4 is an effective focal length of the fourth lens.

14. A camera lens assembly, comprising, sequentially from an object side to an image side along an optical axis, a first lens, a second lens, a third lens, a fourth lens, a fifth lens and a sixth lens, wherein, the first lens has negative refractive power, and an image-side surface of the first lens is a concave surface;

the second lens has negative refractive power, an object-side surface of the second lens is a convex surface, and an image-side surface of the second lens is a concave surface;

the third lens has positive refractive power, and an image-side surface of the third lens is a convex surface;

the fourth lens has refractive power;

the fifth lens has refractive power; and the sixth lens has refractive power, wherein 1.43≤DT11/ImgH<1.8, and 5.59 mm≥ImgH$^2$/f>4.5 mm, where DT11 is an effective half-aperture of an object-side surface of the first lens, f is a total effective focal length of the camera lens assembly, and ImgH is half of a diagonal length of an effective pixel area of an electronic photosensitive element on an imaging plane of the camera lens assembly.

15. The camera lens assembly according to claim 14, wherein $0.5 < R2/f < 1$,
where R2 is a radius of curvature of the image-side surface of the first lens.

16. The camera lens assembly according to claim 14, wherein $0.3 < CT4/CT6 < 0.85$,
where CT4 is a center thickness of the fourth lens along the optical axis, and CT6 is a center thickness of the sixth lens along the optical axis.

17. The camera lens assembly according to claim 16, wherein $(CT2+CT3+CT4+CT5)/TD < 0.5$,
where CT2 is a center thickness of the second lens along the optical axis, CT3 is a center thickness of the third lens along the optical axis, CT4 is a center thickness of the fourth lens along the optical axis, CT5 is a center thickness of the fifth lens along the optical axis, and TD is a distance along the optical axis from the object-side surface of the first lens to an image-side surface of the sixth lens.

18. The camera lens assembly according to claim 14, wherein $0.8 < DT62/ImgH < 1.1$,
where DT62 is an effective half-aperture of an image-side surface of the sixth lens.

19. The camera lens assembly according to claim 14, wherein $1 < SAG12/CT1 < 1.7$,
where SAG12 is an on-axis distance from an intersection of the image-side surface of the first lens and the optical axis to a vertex of a maximum effective half-aperture of the image-side surface of the first lens, and CT1 is a center thickness of the first lens along the optical axis.

20. A camera lens assembly, comprising, sequentially from an object side to an image side along an optical axis, a first lens, a second lens, a third lens, a fourth lens, a fifth lens and a sixth lens,
wherein,
the first lens has negative refractive power, and an image-side surface of the first lens is a concave surface;
the second lens has negative refractive power, an object-side surface of the second lens is a convex surface, and an image-side surface thereof is a concave surface;
the third lens has positive refractive power, and an image-side surface of the third lens is a convex surface;
the fourth lens has refractive power;
the fifth lens has refractive power, and an image-side surface of the fifth lens is a convex surface; and
the sixth lens has positive refractive power,
wherein there is an air interval between each two adjacent lenses of the first to the sixth lenses,
$0.3 < CT4/CT6 < 0.85$,
$-8 < f2/f3 < -3$,
$1.43 < DT11/ImgH < 1.8$, and
$ImgH^2/f > 4.5$ mm,
where CT4 is a center thickness of the fourth lens along the optical axis, CT6 is a center thickness of the sixth lens along the optical axis, ImgH is half of a diagonal length of an effective pixel area of an electronic photosensitive element on an imaging plane of the camera lens assembly, f2 is an effective focal length of the second lens, f3 is an effective focal length of the third lens, DT11 is an effective half-aperture of an object-side surface of the first lens, and f is a total effective focal length of the camera lens assembly.

* * * * *